(12) United States Patent
De La Fuente Sanchez

(10) Patent No.: US 12,388,391 B2
(45) Date of Patent: Aug. 12, 2025

(54) PHOTOVOLTAIC TILE SYSTEM FOR EASY APPLICATION TO A ROOF

(71) Applicant: Alfonso De La Fuente Sanchez, Saanich (CA)

(72) Inventor: Alfonso De La Fuente Sanchez, Saanich (CA)

( * ) Notice: Subject to any disclaimer, the term of this patent is extended or adjusted under 35 U.S.C. 154(b) by 0 days.

(21) Appl. No.: 18/571,229

(22) PCT Filed: Jun. 29, 2022

(86) PCT No.: PCT/CA2022/051041
§ 371 (c)(1),
(2) Date: Dec. 16, 2023

(87) PCT Pub. No.: WO2023/272391
PCT Pub. Date: Jan. 5, 2023

(65) Prior Publication Data
US 2024/0291421 A1    Aug. 29, 2024

Related U.S. Application Data

(60) Provisional application No. 63/216,082, filed on Jun. 29, 2021.

(51) Int. Cl.
*H02S 20/25* (2014.01)
*H02J 50/10* (2016.01)
(Continued)

(52) U.S. Cl.
CPC .............. *H02S 20/25* (2014.12); *H02J 50/10* (2016.02); *H02S 10/20* (2014.12); *H02S 40/36* (2014.12); *H02J 2300/24* (2020.01)

(58) Field of Classification Search
None
See application file for complete search history.

(56) References Cited

U.S. PATENT DOCUMENTS

| 6,553,729 B1 | 4/2003 | Nath et al. |
| 8,522,493 B1 | 9/2013 | Rogers |
| (Continued) | | |

FOREIGN PATENT DOCUMENTS

| CA | 2693297 A1 * | 1/2009 | ............. E04D 13/15 |
| CN | 102035157 A * | 4/2011 | ............. H02S 30/10 |
| EP | 3490008 A1 * | 5/2019 | ........... B32B 15/043 |

OTHER PUBLICATIONS

English language machine translation of CN 102035157 A. (Year: 2025).*

(Continued)

*Primary Examiner* — Eli S Mekhlin
(74) *Attorney, Agent, or Firm* — Baumgartner Patent Law LLC; Marc Baumgartner

(57) ABSTRACT

A photovoltaic tile system has an adhesive gel backing enabling the tiles to be installed as a building-integrated photovoltaic component without the need of other fixtures. A flexible connector, in the form of a conductive tape, connects rows of photovoltaic tiles electrically while at the same time creating a sealant between photovoltaic tiles. The tile system uses inductive energy transmission to transmit energy from the tiles. The tile system can be installed vertically onto building facades, with the photovoltaic tiles connected in series. Each solar panel tile is made of opaque or translucent perovskite crystal, whereby the crystal by itself or in combination with the background gives the solar panel tile a perceived color.

6 Claims, 36 Drawing Sheets

(51) Int. Cl.
    *H02S 10/20*     (2014.01)
    *H02S 40/36*     (2014.01)

(56) References Cited

U.S. PATENT DOCUMENTS

| | | |
|---|---|---|
| 2005/0178429 A1 | 8/2005 | McCaskill et al. |
| 2008/0099062 A1 | 5/2008 | Armstrong et al. |
| 2009/0179662 A1 | 7/2009 | Moulton et al. |
| 2011/0030761 A1* | 2/2011 | Kalkanoglu ............ H10F 19/80 29/897.3 |
| 2017/0054406 A1* | 2/2017 | Narla ...................... H02J 3/381 |

OTHER PUBLICATIONS

Wang et al., J. Phys. Chem. Lett. 2021, 12, 1321-1329. (Year: 2021).*

Canadian International Searching Authority, International Search Report mailed Sep. 26, 2022, International Patent Application No. PCT/CA2022/051041, 4 Pages.

Canadian International Searching Authority, Written Opinion of the International Searching Authority mailed Sep. 26, 2022, International Patent Application No. PCT/CA2022/051041, 8 Pages.

* cited by examiner

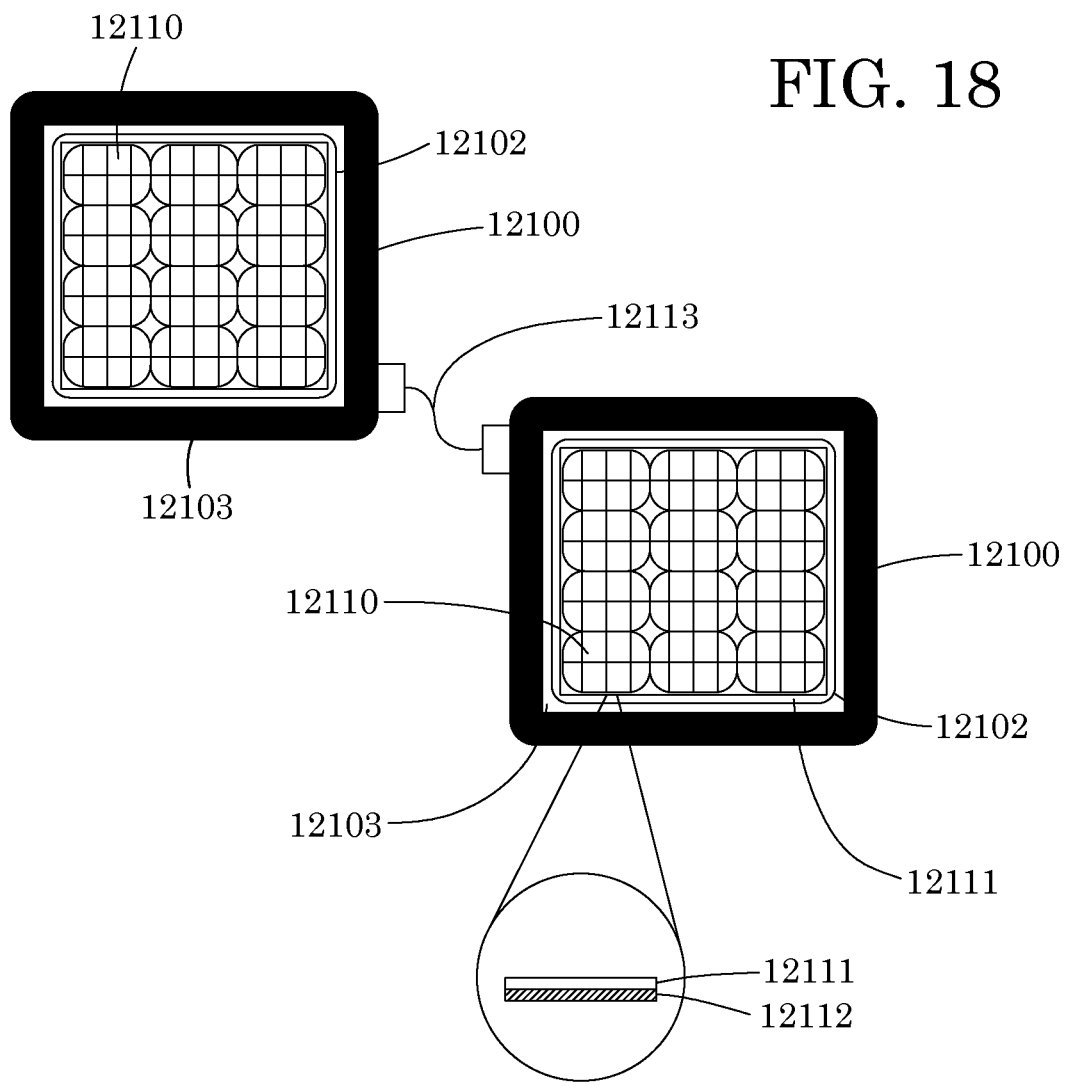

PHOTOVOLTAIC TILE SYSTEM FOR EASY APPLICATION TO A ROOF

CROSS REFERENCE TO RELATED APPLICATIONS

The present invention is filed under 35 U.S.C. § 371 as the U.S. National Phase of International Application No. PCT/CA2022/051041, entitled "PHOTOVOLTAIC TILE SYSTEM FOR EASY APPLICATION TO A ROOF", filed Jun. 29, 2022, which designated the U.S. and claims priority to U.S. Patent Application Ser. No. 63/216,082, entitled "PHOTOVOLTAIC TILE SYSTEM" filed on Jun. 29, 2021, both of which are hereby incorporated in their entirety including all tables, figures, and claims.

FIELD

There is described a photovoltaic tile and photovoltaic tile system that can be attached to a roof without the need for any hardware such as fasteners. More specifically, it is a photovoltaic tile that includes a flexible gel adhesive that allows for attachment and detachment to a range of roofing materials.

BACKGROUND

Solar panels are used for energy utility purposes, to power building, homes, and other energy consuming devices within them. Conventional rooftop solar panels for residential and commercial installation are bulky and heavy. They require special installations mostly done by professionals. Photovoltaic tiles have been around for a couple of decades, they install directly to the roof, and some without the need of specialized supports but they are not removable by the user. U.S. Pat. No. 8,522,493 titled "Solar Powered Roof Components and Systems, and Method of Manufacturing the Same" is an example of a photovoltaic tile system.

What is needed is a photovoltaic tile and tile system. It would be preferable if the tiles could be attached to a roof without any hardware whether the roof is made of shingles, shakes, or is metal. It would be preferable if the tiles could be physically sealed and electrically connected to other tiles in the system. It would be further preferable if the tiles could be detached, moved and applied to another roof. It would be further preferred if the system included a collective power distribution unit.

SUMMARY

The present technology is directed to a photovoltaic tile and tile system. The tiles have an adhesive gel backing which is flexible, allowing attachment to a full range of roof types. The tiles are removable and do not require any fasteners or hardware to attach the solar tiles to the roof of a building, wherein the roof can be made of shingles, shakes, or metal. The tiles can be removed and reused. In the system, a flexible conduit connector connects rows of photovoltaic tiles electrically while at the same time creating a sealant between photovoltaic tiles. The conductor is integrated into the tape and it allows the photovoltaic tile to be connected and sealed in one process. The tile system uses inductive energy transmission to connect a series of photovoltaic tiles together to transmit the energy converted from the photovoltaic tiles to a collective power distribution unit.

The tile system can be installed vertically onto building facades, with the photovoltaic tiles connected in series transporting the energy collected from each photovoltaic tile to another to an inverter at the bottom or edge of the wall or building facade.

Each solar panel tile is made of opaque or translucent perovskite crystal, whereby the crystal by itself or in combination with the background gives the solar panel tile a perceived color. This enables a color to be selected to suit the aesthetics of the installation on the wall or building façade.

In one embodiment, a solar energy harvesting system is provided for use on a roof, the solar energy harvesting system comprising: a multiplicity of flexible tiles which are removable, each flexible tile including a flexible pad, which has an adhesive layer, the flexible pad retaining at least one solar cell, at least one junction box which is in electrical communication with the solar cell, and a wireless radio which is in electronic communication with the junction box and is for wireless communication with a smart device; and a wiring system which includes a connector for electrical communication with the junction box of each flexible tile.

In the solar energy harvesting system, the wiring system may be a flexible conduit harness which includes a flexible casing which includes an outer layer and a back layer, a wire embedded in the flexible casing and an adherent on the back layer.

In the solar energy harvesting system, the flexible conduit harness may be for locating between the flexible tiles, sealing a space defined by adjacent flexible tiles.

The solar energy harvesting system may further comprise a power distribution system which is in electrical communication with the flexible conduit harness.

The solar energy harvesting system may further comprise a battery in electrical communication with the power distribution system.

The solar energy harvesting system may further comprise an electrically conductive bolt, pin or screw for mechanically attaching the flexible conduit harness to the flexible tile.

In another embodiment, an array of flexible tiles are provided which are removably installed on a roof, each flexible tile including a flexible pad, which has an adhesive layer, the flexible pad retaining at least one solar cell, at least one junction box which is in electrical communication with the solar cell, and a wireless radio which is in electronic communication with the junction box and is for wireless communication with a smart device; and a wiring system which includes a connector in electrical communication with the junction box of each flexible tile.

In the array, the wiring system may be a flexible conduit harness which includes a flexible casing which includes an outer layer and a back layer, a wire embedded in the flexible casing and an adherent on the back layer, adhering the wiring system to the roof.

In the array, the flexible conduit harness may be located between the flexible tiles of the array, sealing a space defined by adjacent flexible tiles.

The array may further comprise a power distribution system which is in electrical communication with the flexible conduit harness.

The array may further comprise a battery in electrical communication with the power distribution system.

In the array, the flexible tiles of the array may be wired in a series.

The array may further comprise an electrically conductive bolt, pin or screw mechanically attaching the flexible conduit harness to the flexible tiles.

In another embodiment, a flexible conduit harness is provided for use with photovoltaic tiles, the flexible conduit harness including a flexible casing which includes an outer layer and a back layer, a wire embedded in the flexible casing and an adherent on the back layer.

In another embodiment, am induction photovoltaic tile system is provided, the induction photovoltaic tile system comprising: a first induction photovoltaic tile which includes a photovoltaic outer layer, an internal energy storage unit in electrical communication with the photovoltaic outer layer and an induction power transfer unit, which is in electrical communication with the internal energy storage unit and comprises a first receiver coil and a first transmitter coil; and a second induction photovoltaic tile which includes a photovoltaic outer layer, an internal energy storage unit in electrical communication with the photovoltaic outer layer and an induction power transfer unit, which is in electrical communication with the internal energy storage unit and comprises a second receiver coil and a second transmitter coil, wherein the first transmitter coil is aligned with the second receiver coil.

In the induction photovoltaic tile system, the internal energy storage unit may comprise a battery, a battery management device configured to manage the battery, and a backup power cable in electrical communication with the battery.

In the induction photovoltaic tile system, the inductive power transfer unit may be selected from the group consisting of inductive coupling, resonant inductive coupling and capacitive coupling units.

In another embodiment, a customizable solar panel tile is provided, the customizable solar panel tile comprising: an opaque backing consisting of a conductive material; a multiplicity of solar cells mounted on the opaque backing; a case which retains the opaque backing; a multiplicity of perovskite crystals; a controller; a power supply in electronic communication with the controller and in electrical communication with the multiplicity of perovskite crystals; and a translucent or transparent front conductive film which is attached to the case and extends across the multiplicity of perovskite crystals, wherein the controller controls the power supply to regulate the colour of the multiplicity of perovskite crystals.

BRIEF DESCRIPTION OF THE DRAWINGS

These and other features will become more apparent from the following description in which reference is made to the appended drawings, the drawings are for the purpose of illustration only and are not intended to be in any way limiting, wherein:

FIG. 18A shows a diagram of a solar panel tile.

DESCRIPTION

Figure 1:
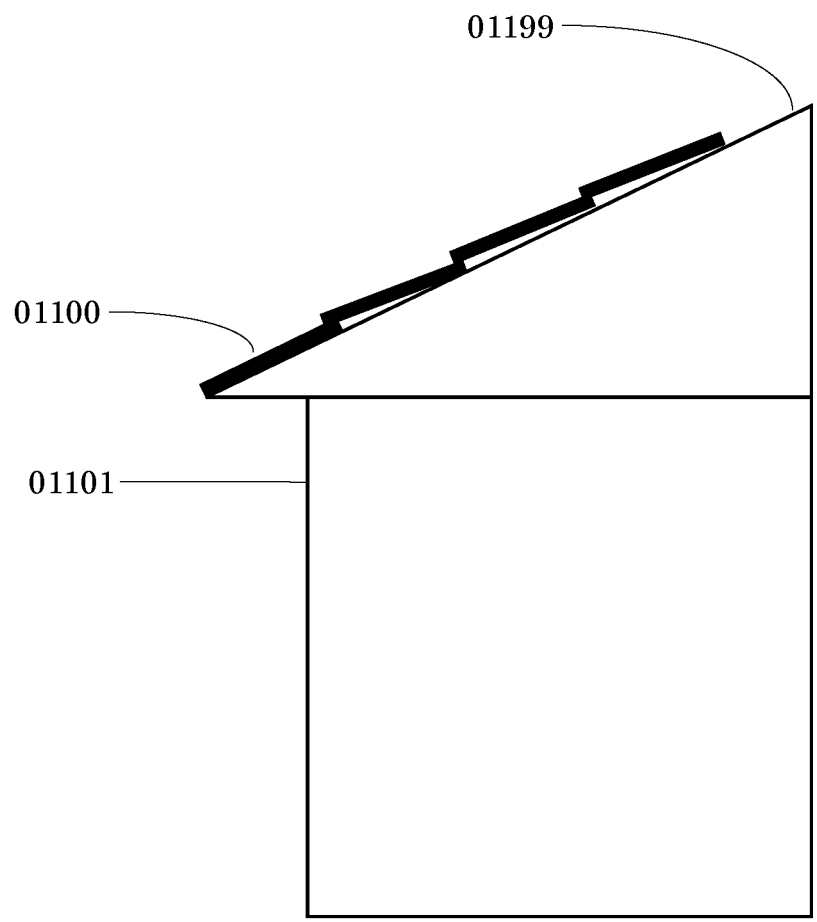
FIG. 1 shows a side view of a building roof shed with asphalt tiles.

Except as otherwise expressly provided, the following rules of interpretation apply to this specification (written description and claims): (a) all words used herein shall be construed to be of such gender or number (singular or plural) as the circumstances require; (b) the singular terms "a", "an", and "the", as used in the specification and the appended claims include plural references unless the context clearly dictates otherwise; (c) the antecedent term "about" applied to a recited range or value denotes an approximation within the deviation in the range or value known or expected in the art from the measurements method; (d) the words "herein", "hereby", "hereof", "hereto", "hereinbefore", and "hereinafter", and words of similar import, refer to this specification in its entirety and not to any particular paragraph, claim or other subdivision, unless otherwise specified; (e) descriptive headings are for convenience only and shall not control or affect the meaning or construction of any part of the specification; and (f) "or" and "any" are not exclusive and "include" and "including" are not limiting. Further, the terms "comprising," "having," "including," and "containing" are to be construed as open-ended terms (i.e., meaning "including, but not limited to,") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. Where a specific range of values is provided, it is understood that each intervening value, to the tenth of the unit of the lower limit unless the context clearly dictates otherwise, between the upper and lower limit of that range and any other stated or intervening value in that stated range, is included therein. All smaller sub ranges are also included. The upper and lower limits of these smaller ranges are also included therein, subject to any specifically excluded limit in the stated range.

Unless defined otherwise, all technical and scientific terms used herein have the same meaning as commonly understood by one of ordinary skill in the relevant art. Although any methods and materials similar or equivalent to those described herein can also be used, the acceptable methods and materials are now described.

Definitions

Tile—in the context of the present technology, a tile is synonymous with a shingle

DETAILED DESCRIPTION

Various components of a photovoltaic tile system will now be described with reference to FIG. 1 through FIG. 24.
Photovoltaic Tiles:

The photovoltaic shingles allow a degree of flexibility for asphalt tiles with a slight curvature. It has an adhesive that will stick onto the asphalt tile, which will avoid the shingle from becoming loose overtime. The solar panels will automatically transfer energy into an inverter or another energy conversion device during the day to harvest solar energy for electricity. This electricity will then be used to help power a house or a building by powering lights, appliances, smart devices, or other power consuming devices.

FIG. 1 shows a side view of a building (01101) and the shed roof (01199) with asphalt tiles (01100). The asphalt tiles or shingles are roof coverings consisting of individual overlapping elements. These elements are typically flat, rectangular shapes laid in courses from the bottom edge of the roof up, with each successive course overlapping the joints below. Shingles are made of various materials such as wood, slate, flagstone, metal, plastic, and composite materials such as fibre cement and asphalt shingles. Ceramic roof tiles, which are still dominant in Europe and some parts of Asia, are still usually called tiles. Roof shingles may deteriorate faster and need to repel more water than wall shingles. They are a very common roofing material in the United States.

Figure 2:
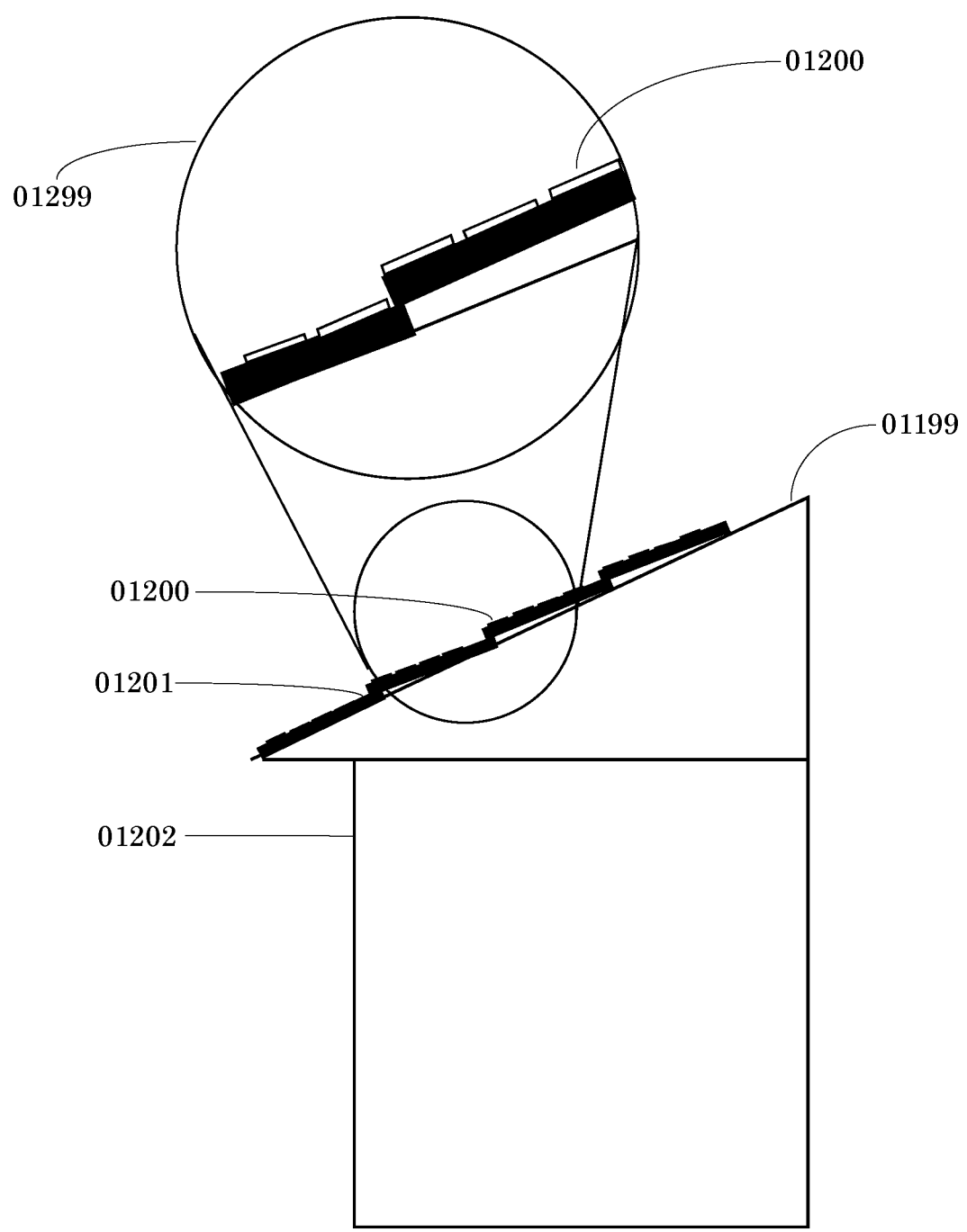
FIG. 2 shows a side view of a roof shed with asphalt shingles and the removable photovoltaic shingle.

FIG. 2 shows a side view of a building (12002) with a shed roof (01199) sheathed with asphalt shingles (01200). Removable photovoltaic shingles (01201) are mounted on the asphalt shingles (01200). In a different embodiment of the technology, the removable photovoltaic shingle is flexible. The flexibility of the photovoltaic shingle can be defined by three characteristics that define its flexibility. First, the amount of stress the material can experience elastically. Second, the amount of stress the material can exhibit when it begins to deform non-elastically. Lastly, the amount of stress the material can experience before it breaks must be considered. The measurement of stress is measured in pascals, and the amount of deformation is measured by the strain.

Figure 3A:
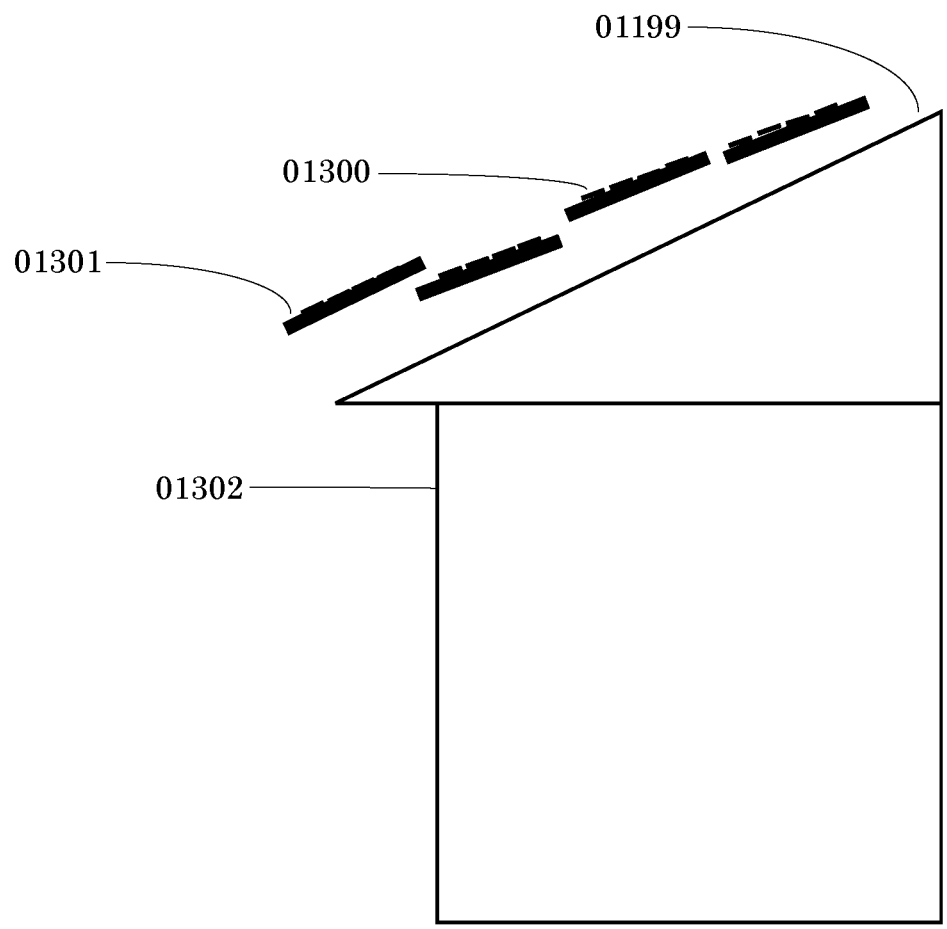
FIG. 3A shows a side perspective view of the removable photovoltaic shingle.

FIG. 3A shows a side view of a building (1302) with a shed roof (01199) with a removable photovoltaic shingle (01300) mounted on an asphalt tile (01301). In this embodiment the removable photovoltaic shingle (01300) is rigid.

Figure 3B:
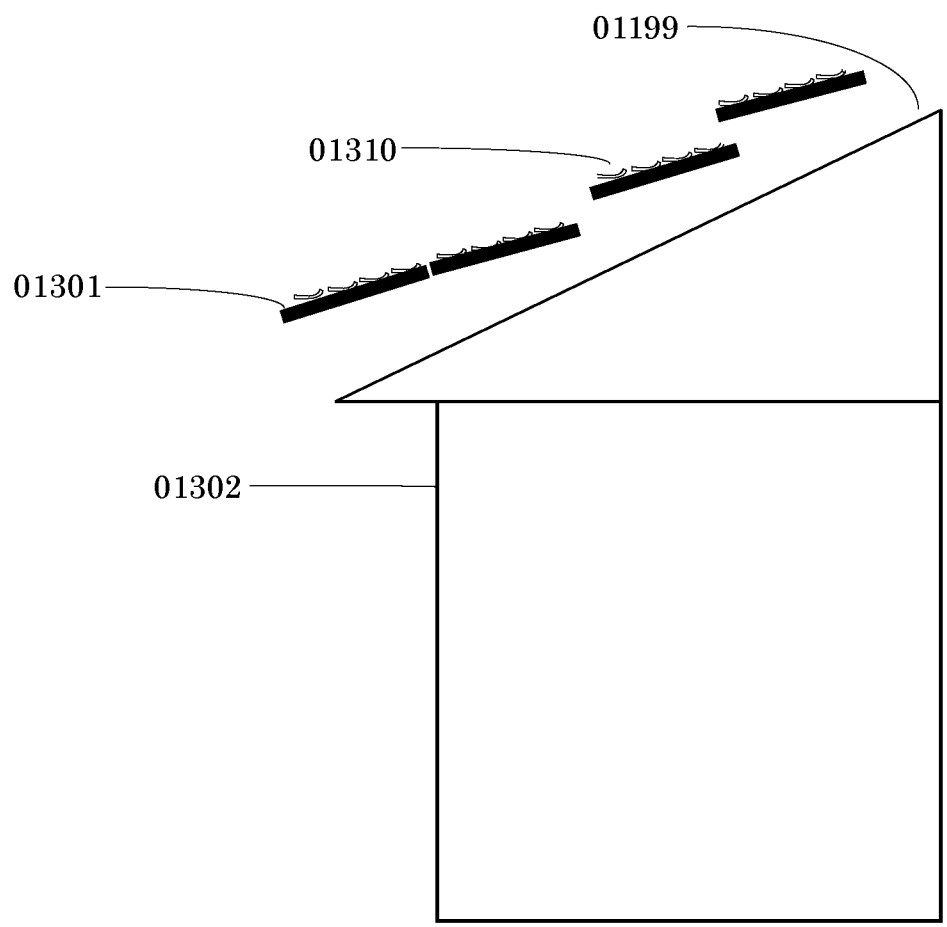
FIG. 3B shows a side perspective view of a different embodiment of the technology.

FIG. 3B shows a side perspective view of a different embodiment of the technology where the removable photovoltaic shingle (01300) is flexible (01310).

In another embodiment of the technology, the photovoltaic shingle (01300) or photovoltaic tile has a built-in junction box.

Figure 4:
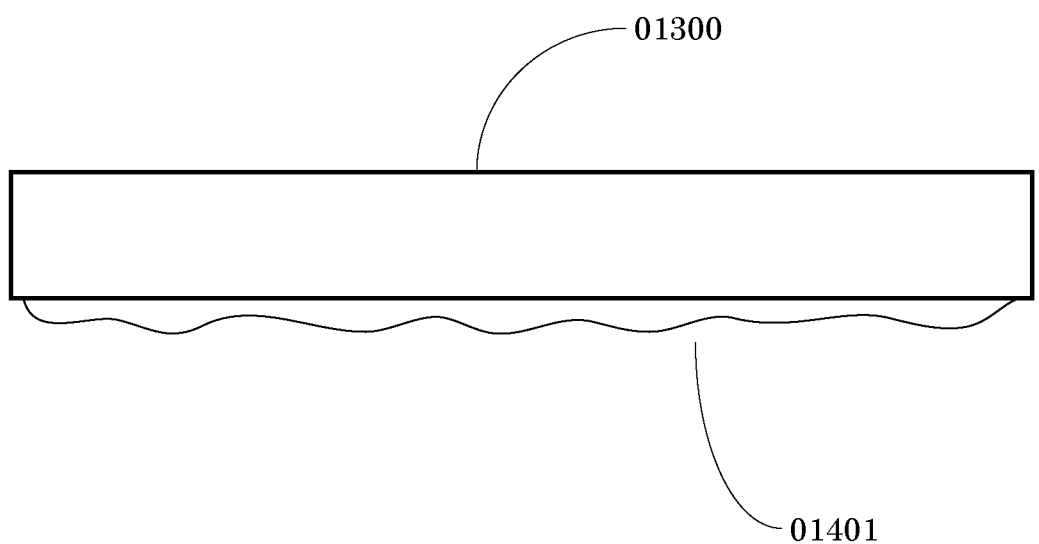
FIG. 4 shows a side view of the removable photovoltaic shingle.

FIG. 4 shows a side view of the removable photovoltaic shingle (01300) showing the back support (01401) made of adhesive. Specifically, in one embodiment of the technology and as depicted in FIG. 4, a flexible photovoltaic tile (01300) may also be removed from any mounting surface by peeling it off at one or more of its corners.

Figure 5:
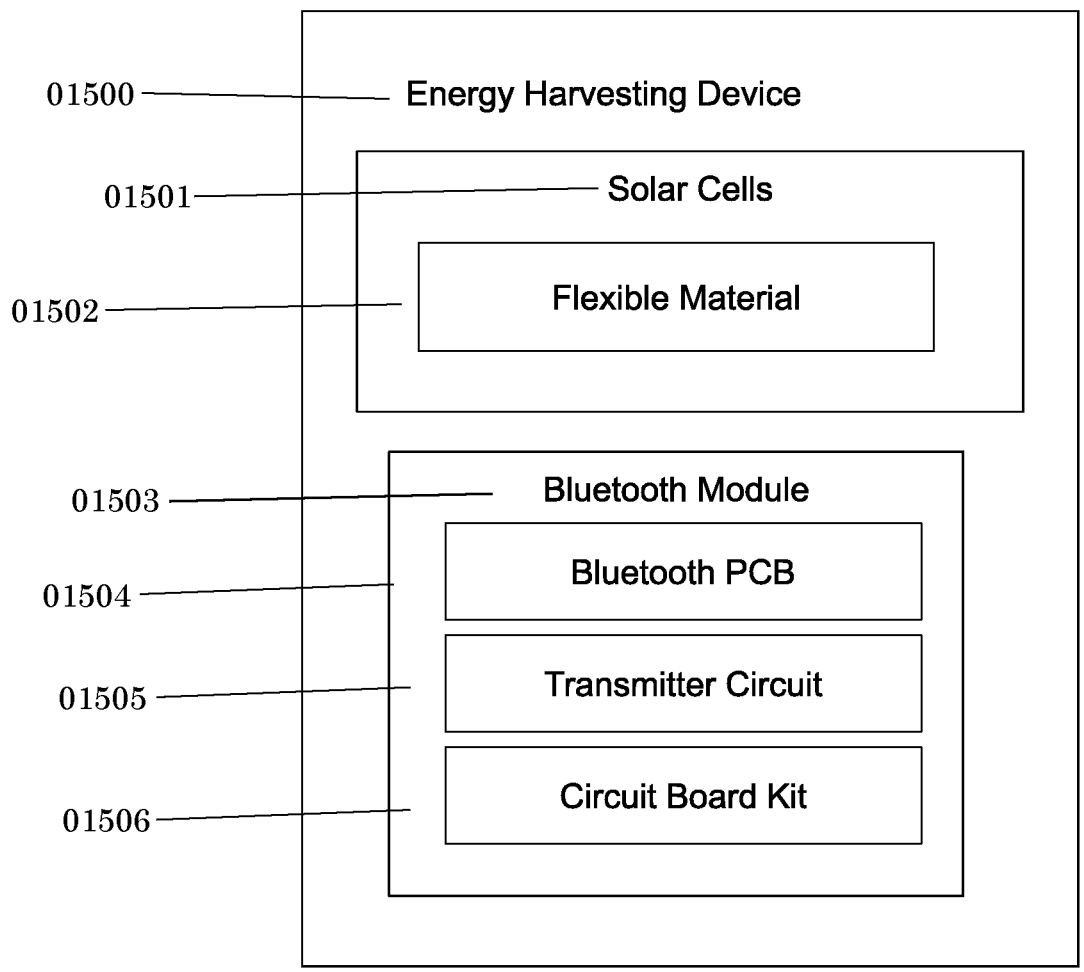
FIG. 5 shows a diagram of an energy harvesting device.

FIG. 5 shows a diagram of an energy harvesting device (01500), which is an asphalt tile with one or more solar cells (01501) mounted on a flexible pad (01502). Also on the flexible pad (01502) is a Bluetooth module (01503) with an integrated printed circuit board (PCB) (01504) connected to a transmitter circuit (01505) located on the Bluetooth circuit board (01506). This allows the Bluetooth module (01503) to connect directly to a smart device.

The flexible pad (01502) may be a pliable and lightweight, yet durable and tear-resistant sheet of material. Examples of said material include, but are not limited to, films (e.g., polyester, polyethylene, polyurethane, polypropylene, polytetrafluorethylene (PTFE), vinyl, etc.), foams (e.g., acrylic, polyethylene, urethane, neoprene, etc.), foils (e.g., aluminum, copper, lead, stainless steel, etc.), cloths (e.g., cotton, polyester, acetate, nylon, rayon, etc.), rubbers (e.g., silicone, neoprene, ethylene propylene diene monomer (EPDM), other natural and/or synthetic elastomers, etc.), or a combination thereof. The flexible pad (01502) may include a back surface (not shown) coated with a removable and/or reusable pressure-sensitive acrylic, rubber, or silicone-based adhesive layer. The removable and/or reusable adhesive may facilitate the temporary attachment of the flexible pad (01502), and thus the flexible photovoltaic tile, to the mounting surface, i.e. the roof of a house (as in FIG. 1). Further, in one embodiment of the technology, the flexible pad (01502) may include an uncoated front surface (as is the case for embodiments of the removable photovoltaic tile shown in FIG. 2. In another embodiment of the technology, the front surface of the flexible pad (01502) may alternatively be coated with a temporary or permanent pressure-sensitive acrylic, rubber, or silicone-based adhesive whereon additional components (e.g., a flexible photovoltaic tile mounting plate) and/or an electronic device may be adhered.

In one embodiment of the technology, a backing material may support the affixture of the coupler to the flexible pad (01502). The backing material may be, for example, but not limited to, thermoset plastics (e.g., polyurethanes, polyesters, epoxy resins, phenolic resins, 15 etc.), thermoplastics (polyethylene (PE), polypropylene (PP), polyvinyl chloride (PVC), etc.), other organic polymers, or a combination thereof. The backing material may be affixed to the front surface of the flexible pad (01502) through, for example, a permanent adhesive.

Flexible Conduit Harness for Photovoltaic Tiles:

Building-integrated photovoltaics include solar tiles or photovoltaic tiles, individual solar panels that create a network of solar panels to collect solar energy. Most of the time, these solar tiles connect between each other via cables, wires or connector to connector contacts. When installing individual tiles, a gap between the tiles may be present, in such a gap dust can collect and mold or plants could start growing jeopardizing the correct operation of the solar cells within the solar tiles. A flexible conduit connector that connects rows of photovoltaic tiles electrically while at the same time creating a sealant between photovoltaic tiles is provided. The conductor is integrated into the tape and it allows the photovoltaic tile to be connected and sealed in one process.

Figure 6A:
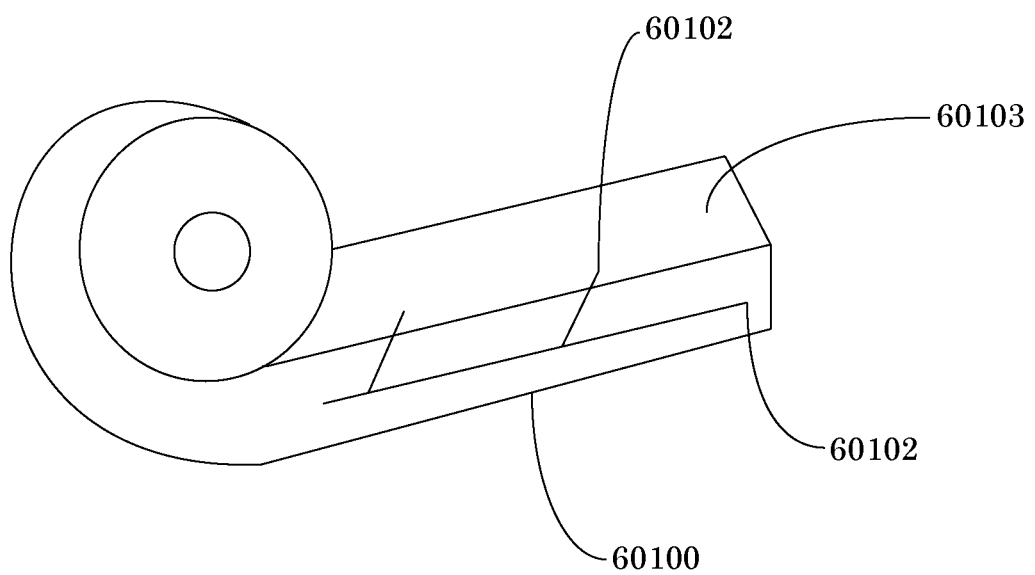
FIG. 6A shows a side perspective view of the tape in a roll.

FIG. 6A shows a side perspective view of a strip of film like tape in a roll. Where the tape has an integrated wire or cable (60102). The tape can be cut to a needed length, or in another form of the technology it can have pre-cut strips with pre-cut wires with the correct length.

In a different embodiment of the technology this photovoltaic tile sealant flexible conduit harness comprises a strip of film which also comprises a sealing layer (60100), a connector (60101), the integrated wire or cable (60102) and an adhesive backing (60103), wherein the strip of film is used a sealant and connection for photovoltaic tiles.

Figure 6B:
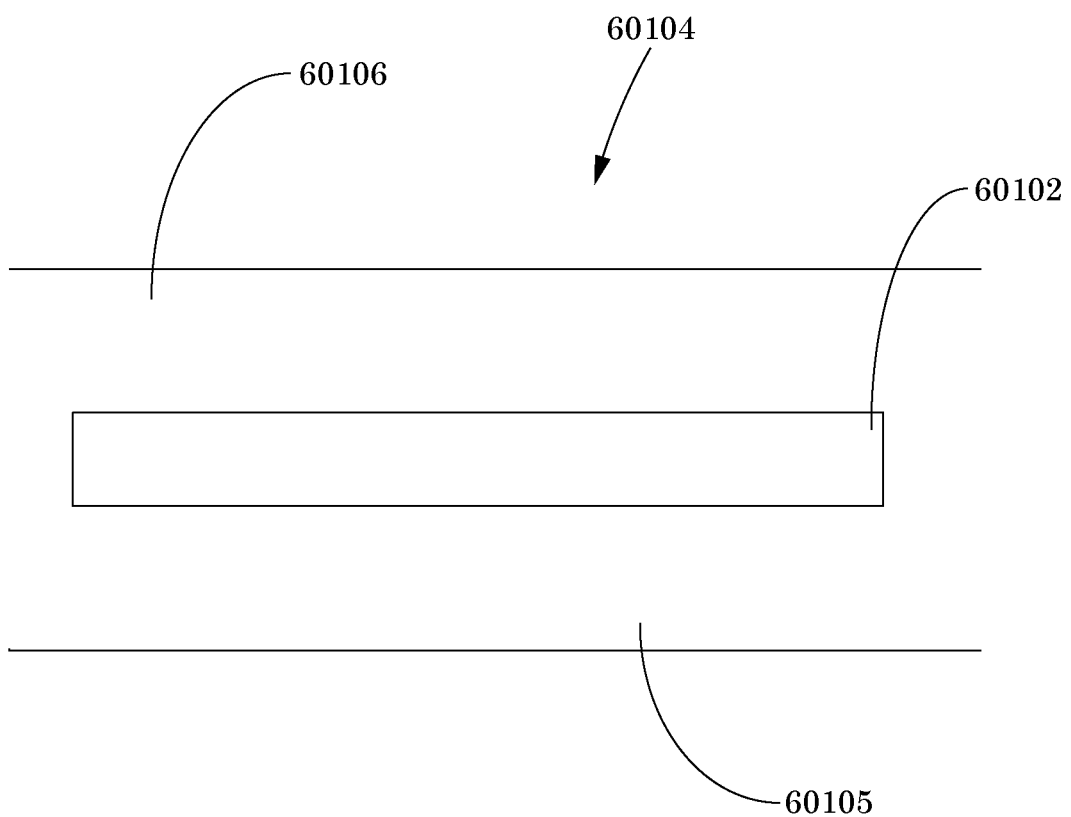
FIG. 6B shows a top view of the flexible conduit harness with back adhesive.

FIG. 6B shows a cross-sectional side view of a strip of a flexible conduit harness (60104) with an adherent in the back layer (60105), wherein the adherent comprises one or more from the group of adhesive, glue, stick and peel, hook and loop fasteners. The flexible conduit harness (60104) further includes the integrated wire or cable (60102) and a flexible casing with an outer layer (60106) which comprises one or more of the following types of materials: films (e.g., polyester, polyethylene, polyurethane, polypropylene, polytetrafluorethylene (PTFE), vinyl, etc.), foams (e.g., acrylic, polyethylene, urethane, neoprene, etc.), foils (e.g., aluminum, copper, lead, stainless steel, etc.), cloths (e.g., cotton, polyester, acetate, nylon, rayon, etc.), rubbers (e.g., silicone, neoprene, ethylene propylene diene monomer (EPDM), other natural and/or synthetic elastomers, etc.), or a combination thereof.

Figure 6C:
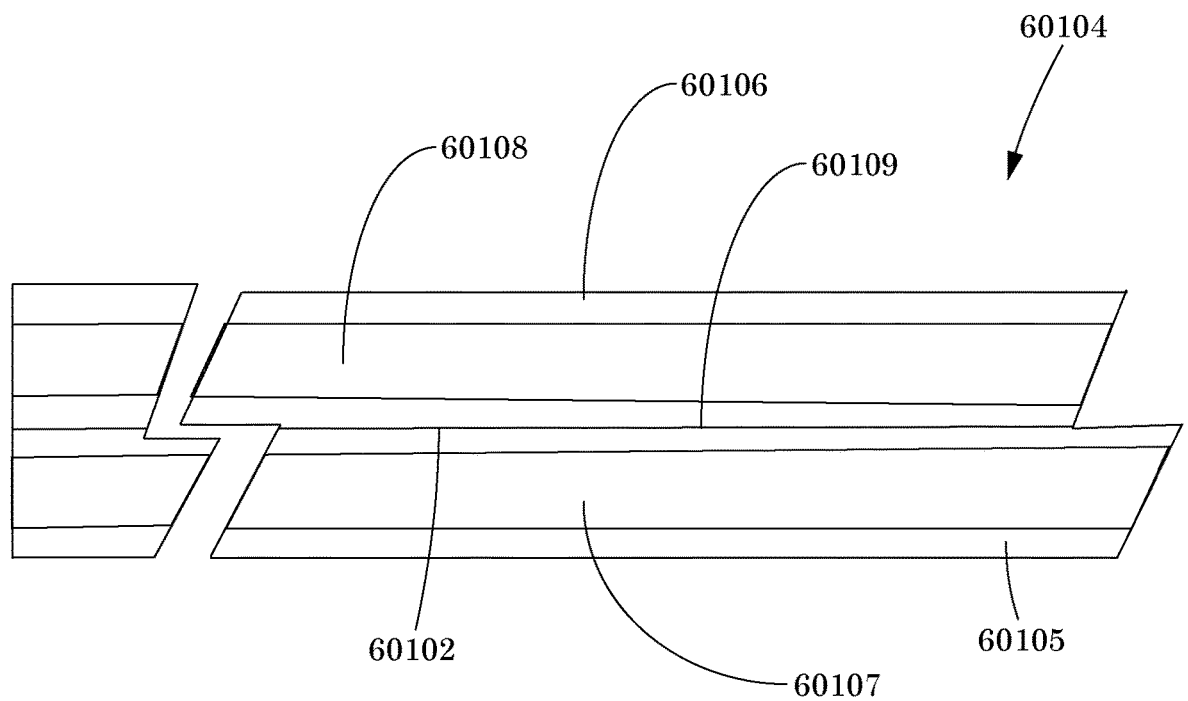
FIG. 6C shows a side view of the strip of flexible conduit harness with back adhesive.

FIG. 6C shows a cross-sectional top view of the strip of flexible conduit harness (60104). Under the outer layer (60106) there are middle layers (60107, 60108, 60109) that contains a conductive element (60102) which may be a wire, a metal sheet, or a group of wires. The back layer (60105) comprises an adhesive which may contain one of the following adhesive types: acrylic, rubber or silicone or others.

Figure 7A:
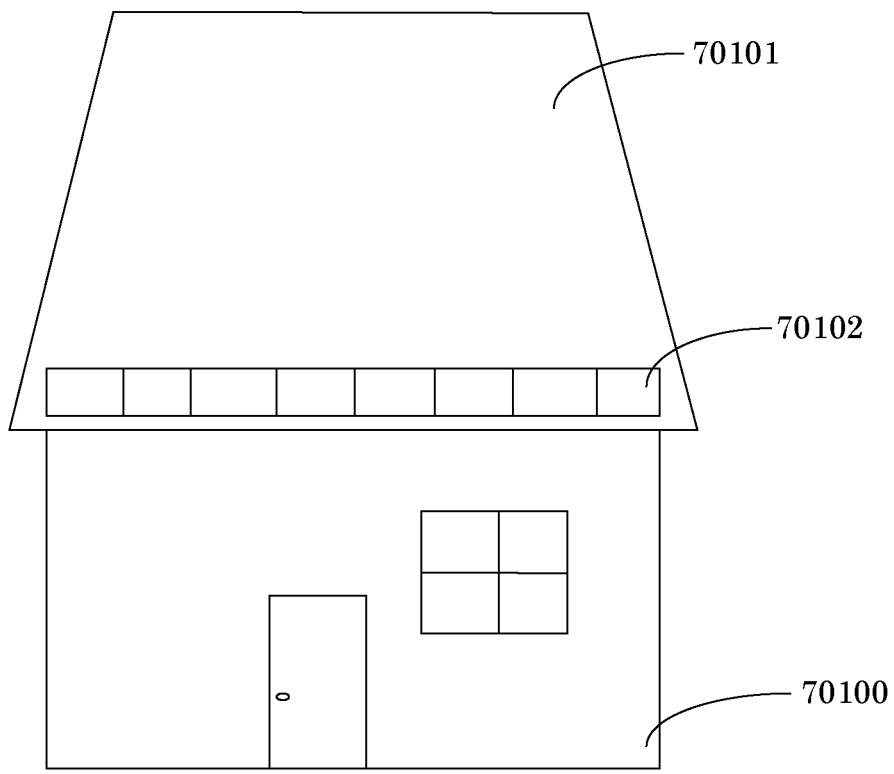
FIG. 7A shows a top view of a roof shed covered with asphalt shingle.

FIG. 7A shows a house (70100) with a top view of a shed roof (70101) covered with asphalt shingles with one row of installed removable photovoltaic tiles (70102).

Figure 7B:
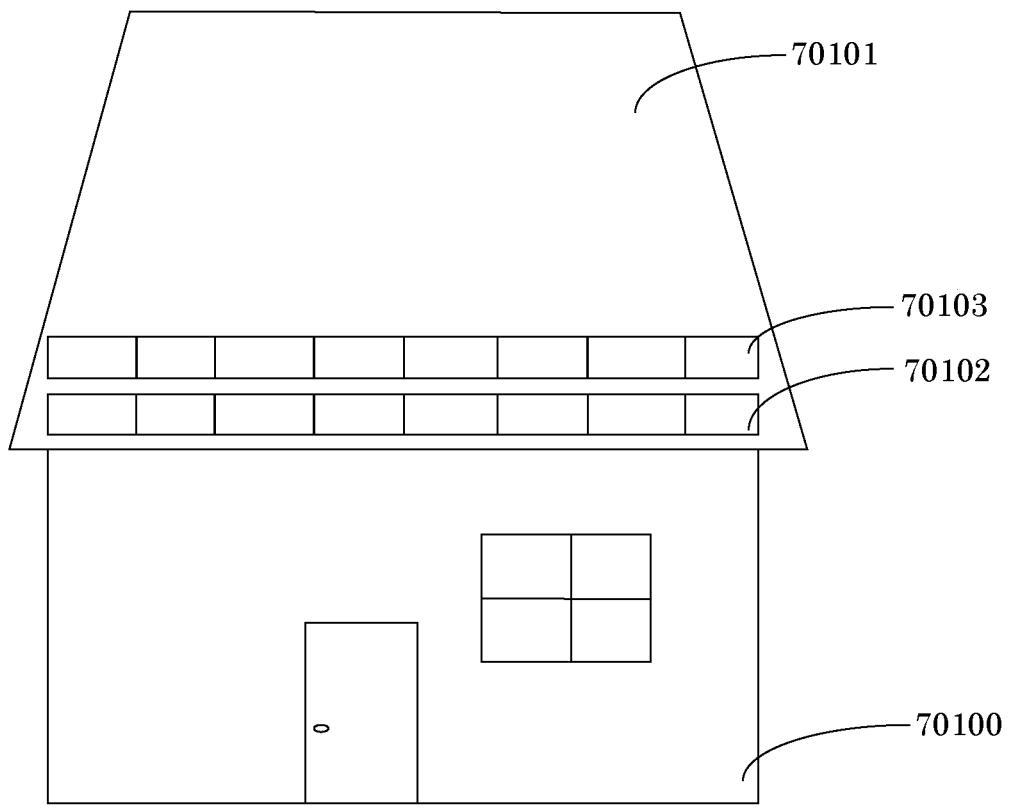
FIG. 7B shows a top view of a roof shed covered with asphalt shingles.

FIG. 7B shows a top view of a shed roof (70100) covered with asphalt shingles with two rows of installed removable photovoltaic tiles (70102, 70103). Where one can see the gap in between the first and second row of installed removable photovoltaic tiles (70102, 70103).

Figure 8A:
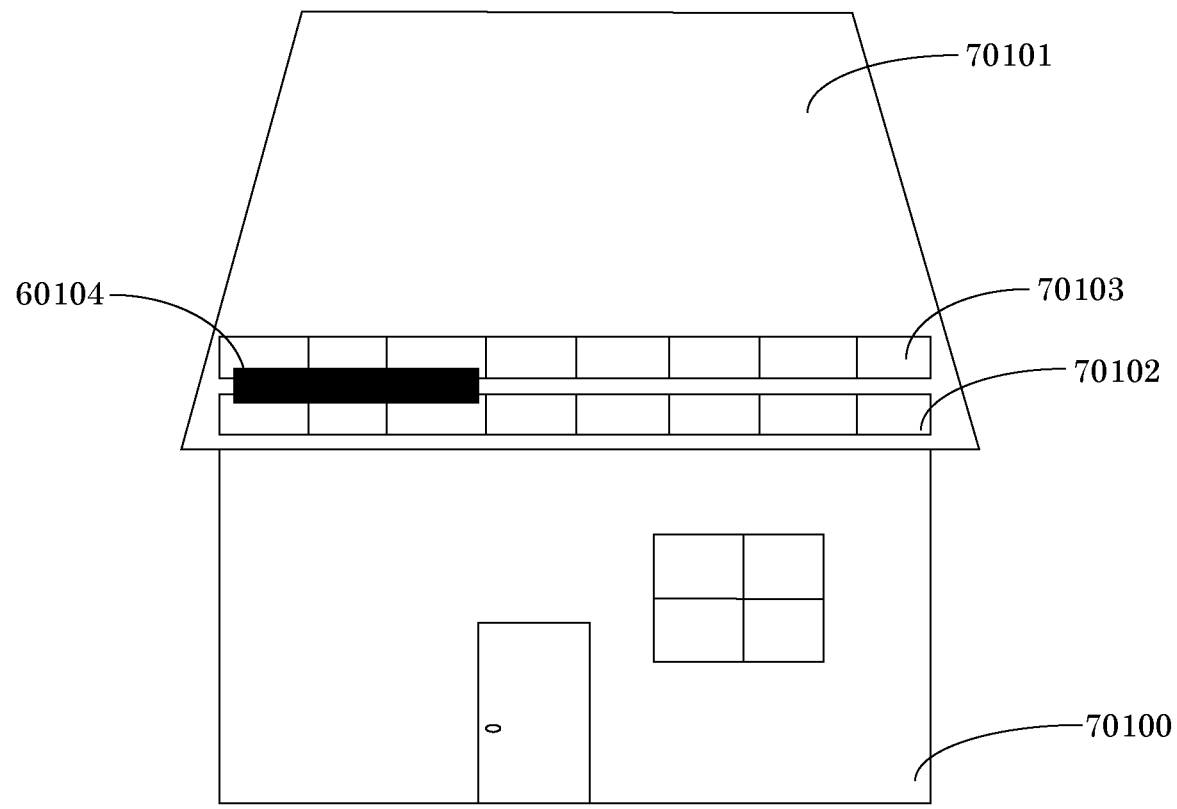
FIG. 8A shows the same image as FIG. 7B, where the photovoltaic tiles are partially covered by the flexible conduit harness.

FIG. 8A shows the same image as FIG. 7B, this time partially covered by the flexible conduit harness (60104) for photovoltaic tiles of the technology. While the flexible conduit harness with back adhesive covers the gap, it also connects in series the removable photovoltaic tiles in an array of flexible photovoltaic tiles.

Figure 8B:
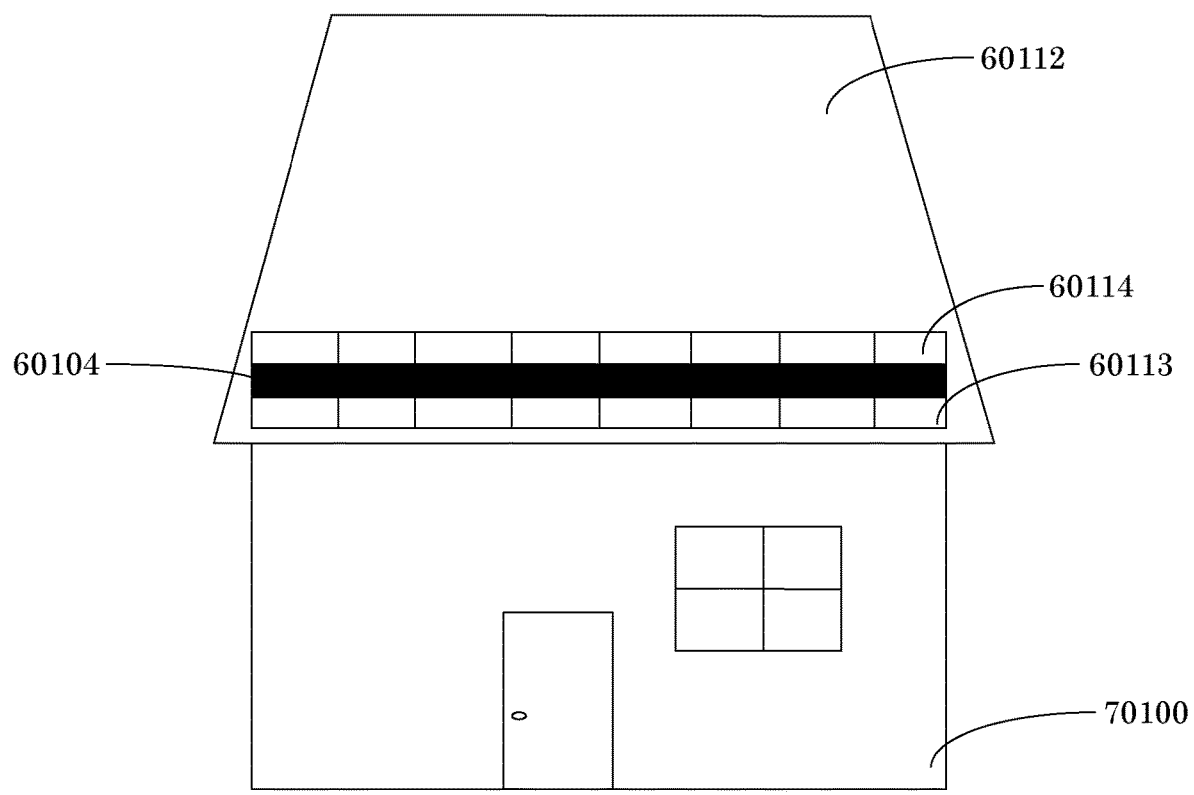
FIG. 8B shows the continuation of FIG. 8A, where the photovoltaic tiles are entirely covered by the flexible conduit harness.

FIG. 8B shows the continuation of FIG. 8A, this time showing the gap between rows fully covered by the flexible conduit harness (60104).

Figure 9:
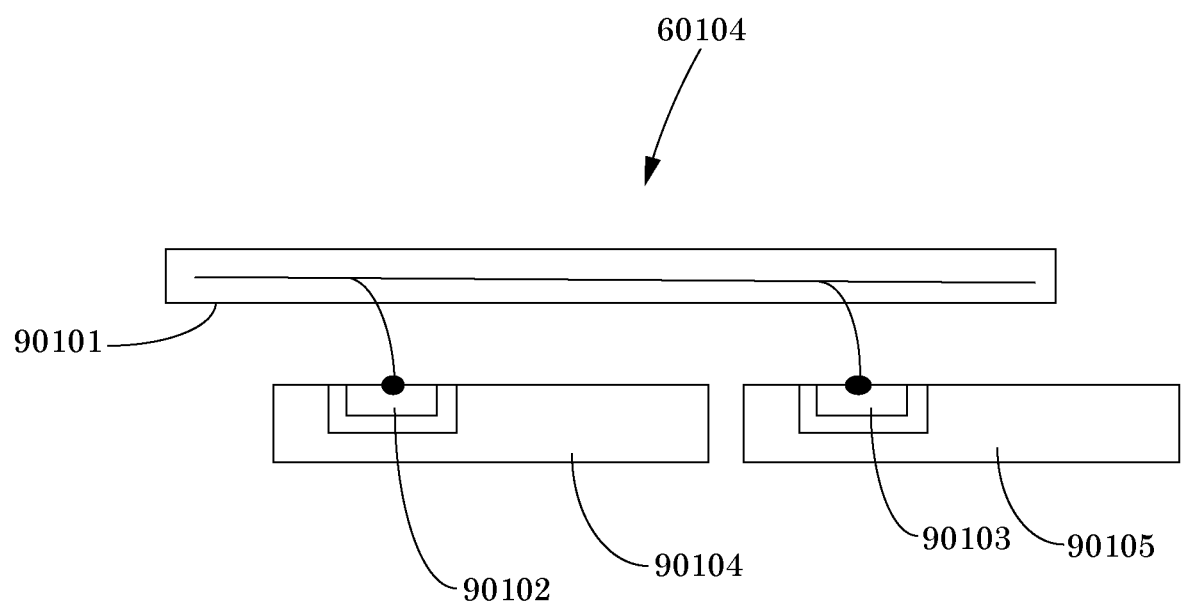
FIG. 9 shows a side perspective view of the flexible conduit harness.

FIG. 9 shows a side perspective view of the flexible conduit harness (60104) with the back layer (60105), connected to the connectors of the junction box (90102, 90103) in the removable photovoltaic tiles (90104, 9015).

Figure 10A:
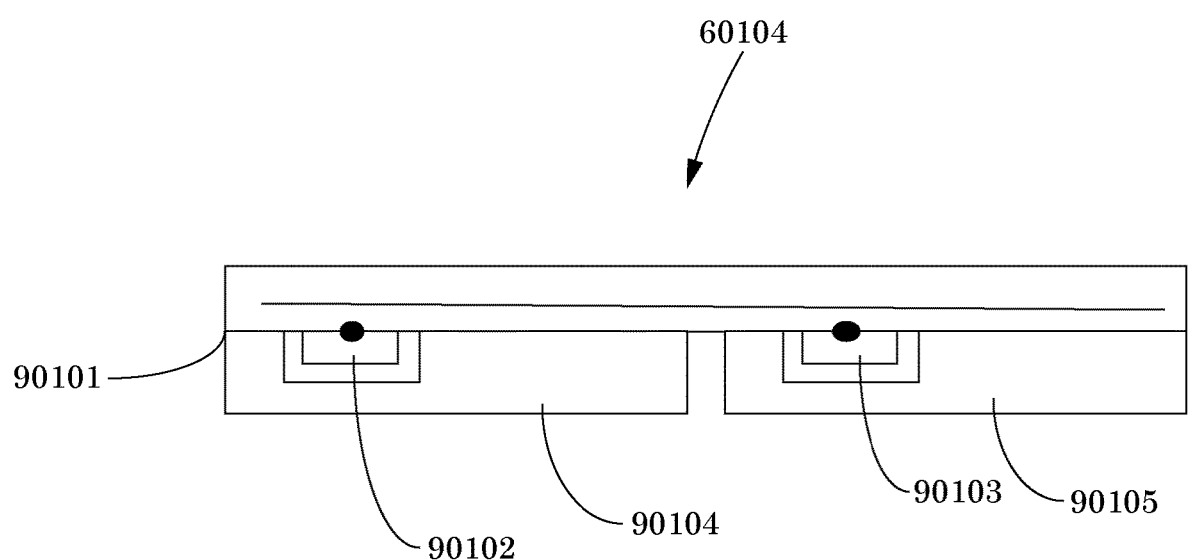
FIG. 10A is a top cross-sectional view of the two rows of removable photovoltaic tiles.

FIG. 10A is a top cross-sectional view of the 2 rows of removable photovoltaic tiles (90104, 90105) with the flexible conduit harness (60104) with back adhesive layer (90101) installed showing the connectors (90102, 90103) connected to the removable photovoltaic tiles (90104, 9015).

Figure 10B:
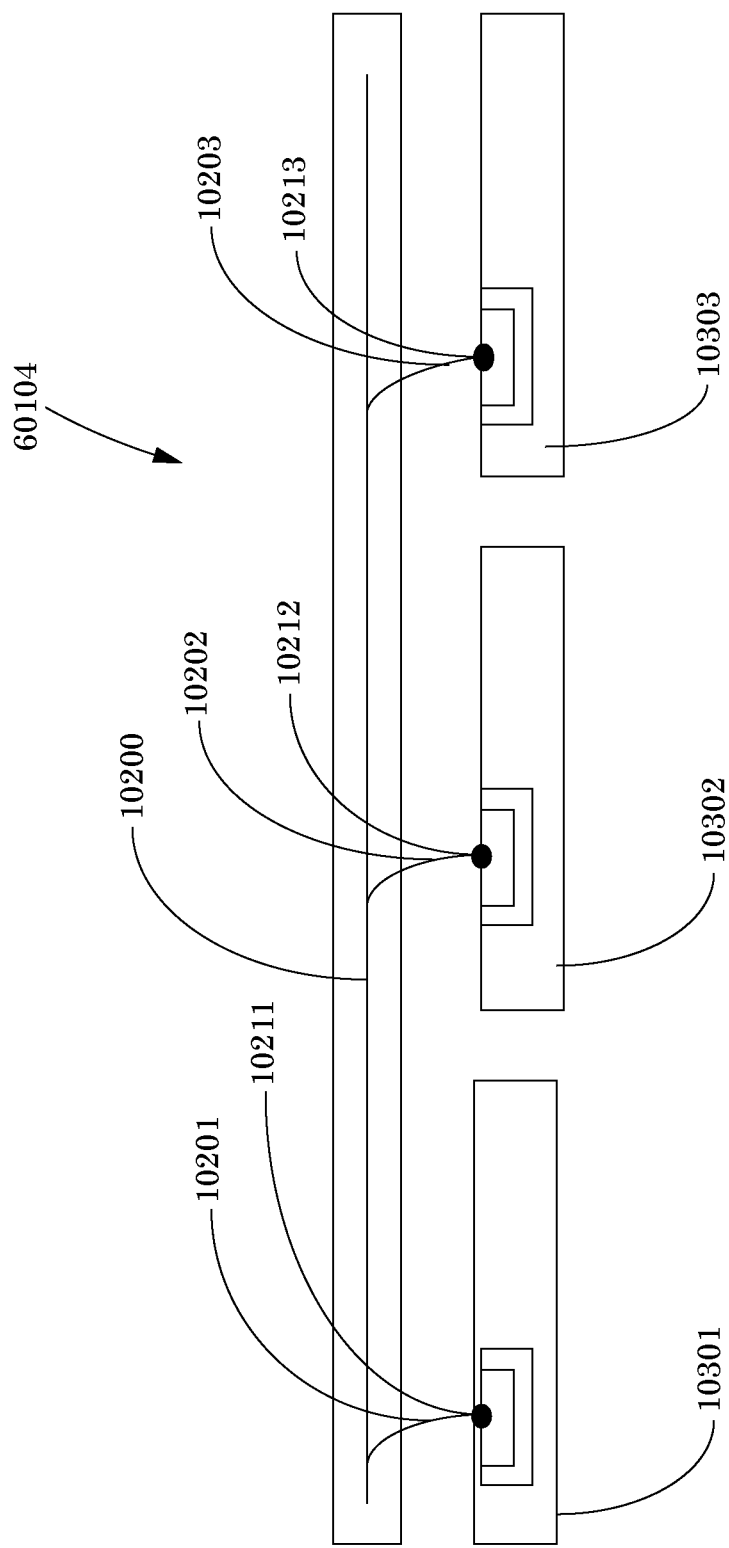
FIG. 10B shows a different embodiment of the technology consisting of three photovoltaic tiles.

FIG. 10B shows a different embodiment of the technology comprising a first strip of cable (10201) or cables which is connected to at least one of the cables (10200) or wires in the flexible conduit harness (60104), wherein the first strip of cable comprises a first junction box connector (10211), wherein the first junction box connector connects to the first photovoltaic tile (10301). A second strip of cable (10202) or cables is connected to at least one of the cables or wires in flexible conduit harness (60104), wherein the second strip of cable is positioned at a preset distance from the first strip of cable, wherein the second strip of cable comprises a second junction box connector (10212), wherein the second junction box connector connects to the second photovoltaic tile (10302). Followed by a third strip of cable (10203) or cables connected to at least one of the cables or wires in the flexible conduit harness (60104), wherein the third strip of cable is positioned at a preset distance from the second strip of cable, wherein the third strip of cable comprises a third junction box connector (10213), wherein the third junction box connector connects to the third photovoltaic tile (10303).

In a different embodiment of the technology, it further comprises a start connector at the start of the strip of film that connects the flexible conduit harness (60104) to a junction box or a power distribution system. While at the opposite end of the strip of film there is a connector that connects to a power distribution system. The power distribution system may be connected to a battery or batteries.

Figure 10C:
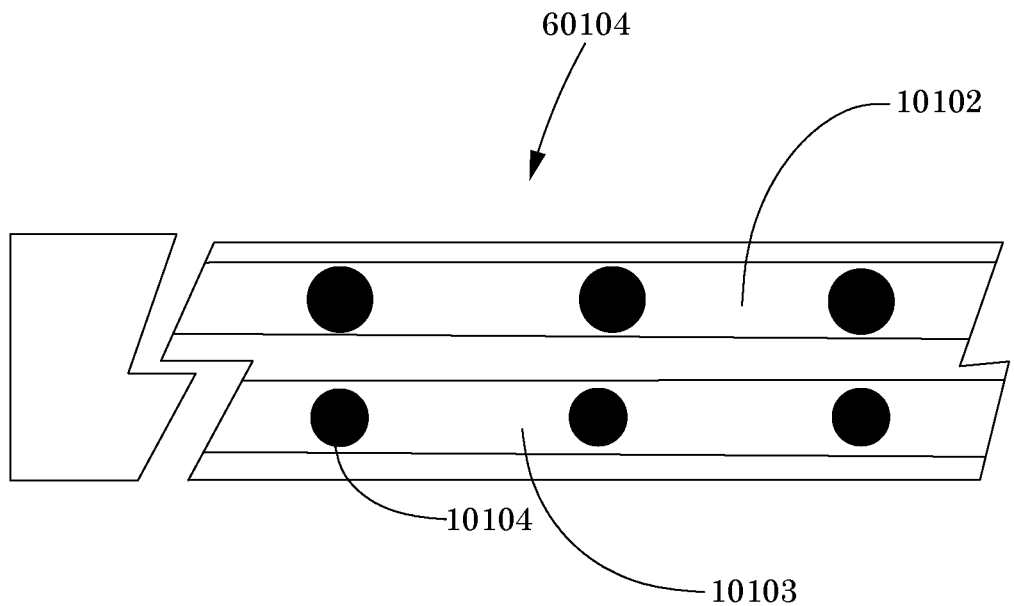
FIG. 10C shows a top cross-sectional view of the flexible conduit harness.

FIG. 10C shows a top cross-sectional view of the flexible conduit harness (60104) that includes at least one set of wires or cables (10102, 10103), wherein the set of cables comprise an indent (10104). A bolt, pin or screw can pass that indent (10104) and connect the wire to the junction box at the photovoltaic tile.

Figure 10D:
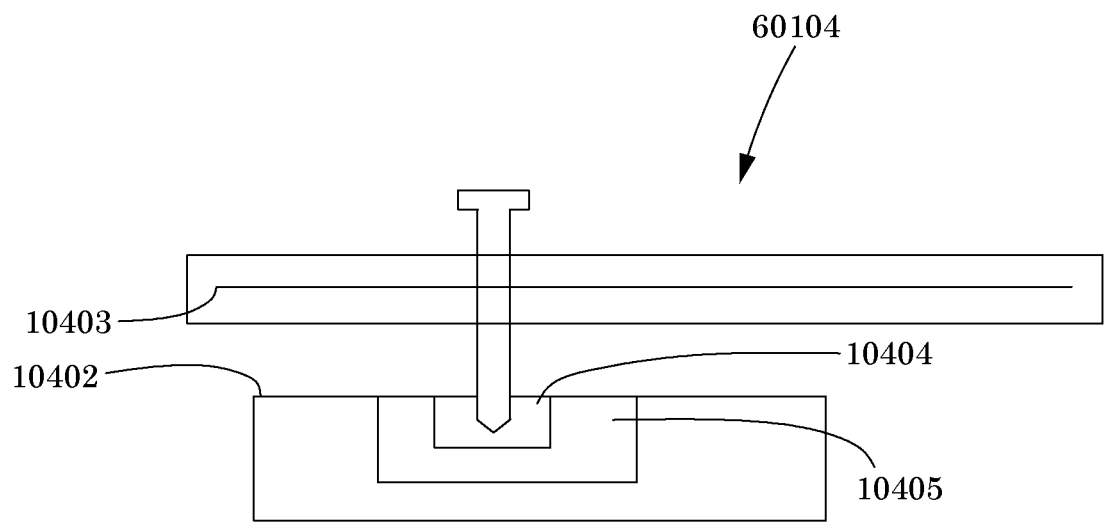
FIG. 10D shows a cross sectional side view of a flexible conduit harness.

FIG. 10D shows a cross-sectional side view of a flexible conduit harness (10401) on top of photovoltaic tiles (10402) in a different embodiment of the technology wherein the cables or wires (10403) that run through the flexible conduit harness (60104), have an indent, wherein a bolt, pin or screw can cross that indent without breaking the connectivity of the cable or wire, wherein the bolt or screw is made of a conductive material, whereby when the screw or bolt passes through the cable and touches the connector (10404) at the photovoltaic tile, it mechanically connects the photovoltaic tile's junction box (10405) with the strip of wire. One familiar with the art will appreciate that when installing the strip of film on top of the photovoltaic tiles there is no need to connect single connectors to the junction box at the photovoltaic tile as the bolts or screws do that work. One familiar with the art will also appreciate that there is no need to space connectors within the strip of film as a potential installer just needs to identify where the connectors for the photovoltaic tile's junction box are.

In one embodiment of the technology the strip of film is translucent.

Inductive Energy Transmission:

A photovoltaic tile system is provided that uses inductive energy transmission to connect a multiplicity of photovoltaic tiles together to transmit the energy converted from the photovoltaic tiles to a collective power distribution unit.

Figure 11A:
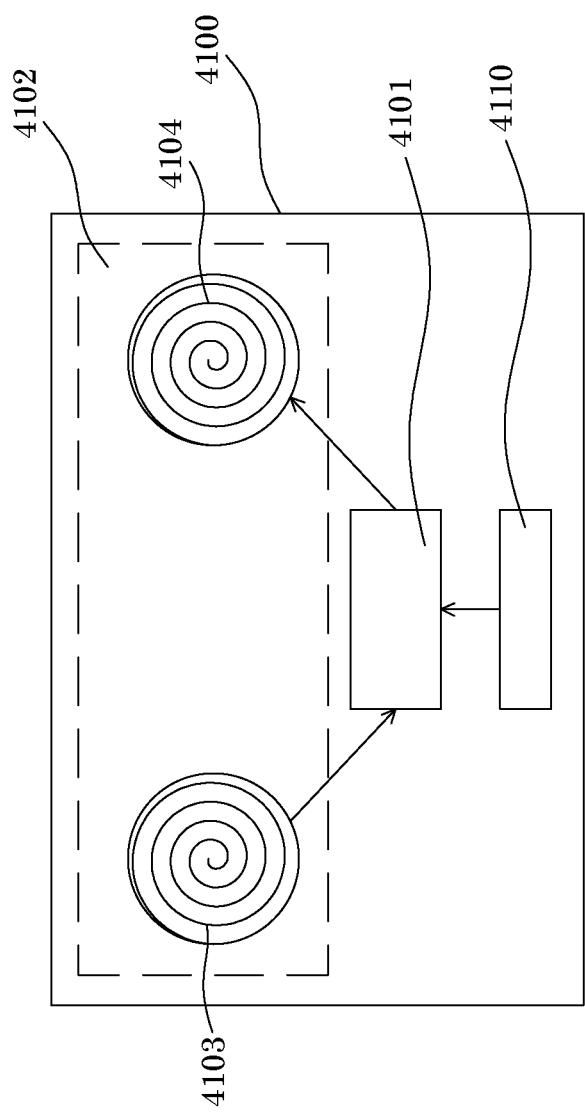
FIG. 11A shows a front cross-sectional view of the contactless photovoltaic tile.

FIG. 11A shows a front cross-sectional view of the contactless photovoltaic tile (4100). The contactless photovoltaic tile (4100) comprises a photovoltaic outer surface (4110) with an internal energy storage unit (4101) and a wireless inductive power transfer unit (4102); wherein the internal energy storage unit (4101) is operatively connected to the photovoltaic tile outer surface (4110) and to the inductive power unit (4102); wherein the internal energy storage unit (4101) temporarily stores the electric energy generated from the photovoltaic tiles; wherein the inductive power unit (4102) comprises a receiver (RX) coil (4103) and a transmitter (TX) coil (4104); wherein the internal storage unit (4101) receives power from the photovoltaic tile outer surface (4110) and from the wireless power transfer receiver RX(4103); wherein the internal storage unit (4102) transmits power to the wireless power transfer transmitter (4104).

In a different embodiment of the technology, the internal energy storage unit (4101) comprises a battery, a battery management device configured to manage the battery, and a backup power cable operatively connected to the battery.

In a different embodiment of the technology, the internal energy storage unit is configured to provide direct current (DC) to the inductive power unit, wherein the inductive power unit comprises an inductive power cable configured to receive the DC, wherein the inductive power unit comprises an inductive RX coil and an inductive power cable operatively connected to the inductive RX coil.

In a different embodiment of the technology the photovoltaic outer surface uses perovskites as its main source of photovoltaic material used for energy conversion.

One familiar with the art will appreciate that the RX and TX coils can be replaced by metal plate electrodes for capacitive coupling.

The technology collects energy from the sun, transforms it into electrical energy and transmits it via a series of similar photovoltaic tiles transmitting the energy via the wireless power transfer unit.

One familiar with the art will also appreciate that the inductive power unit is one or more from the group of inductive coupling, resonant inductive coupling, capacitive coupling.

In inductive coupling (electromagnetic induction or inductive power transfer, IPT), power is transferred between coils of wire by a magnetic field. The transmitter and receiver coils together form a transformer. An alternating current (AC) through the transmitter coil (L1) creates an oscillating magnetic field (B) by Ampere's law. The magnetic field passes through the receiving coil (L2), where it induces an alternating EMF (voltage) by Faraday's law of induction, which creates an alternating current in the receiver. The induced alternating current may either drive the load directly or be rectified to direct current (DC) by a rectifier in the receiver, which drives the load. A few systems, such as electric toothbrush charging stands, work at 50/60 Hz so AC mains current is applied directly to the transmitter coil, but in most systems an electronic oscillator generates a higher frequency AC current which drives the coil, because transmission efficiency improves with frequency. Inductive coupling is the oldest and most widely used wireless power technology, and virtually the only one so far which is used in commercial products. It is used in inductive charging stands for cordless appliances used in wet environments such as electric toothbrushes and shavers, to reduce the risk of electric shock. Another application area is "transcutaneous" recharging of biomedical prosthetic devices implanted in the human body, such as cardiac pacemakers and insulin pumps, to avoid having wires passing through the skin. It is also used to charge electric vehicles such as cars and to either charge or power transit vehicles like buses and trains. However, the fastest growing use is wireless charging pads to recharge mobile and handheld wireless devices such as laptop and tablet computers, cellphones, digital media players, and video game controllers. In the United States, the Federal Communications Commission (FCC) provided its first certification for a wireless transmission charging system in December 2017.

Resonant inductive coupling (electrodynamic coupling, strongly coupled magnetic resonance) is a form of inductive coupling in which power is transferred by magnetic fields (B, green) between two resonant circuits (tuned circuits), one in the transmitter and one in the receiver (see diagram, right). Each resonant circuit consists of a coil of wire connected to a capacitor, or a self-resonant coil or other resonator with internal capacitance. The two are tuned to resonate at the same resonant frequency. The resonance between the coils can greatly increase coupling and power transfer, analogously to the way a vibrating tuning fork can induce sympathetic vibration in a distant fork tuned to the same pitch. Nikola Tesla first discovered resonant coupling during his pioneering experiments in wireless power transfer around the turn of the 20th century, but the possibilities of using resonant coupling to increase transmission range has only recently been explored. In 2007 a team led by Marin Soljačić at MIT used two coupled tuned circuits each made of a 25 cm self-resonant coil of wire at 10 MHz to achieve the transmission of 60 W of power over a distance of 2 meters (6.6 ft) (8 times the coil diameter) at around 40% efficiency. The concept behind resonant inductive coupling systems is that high Q factor resonators exchange energy at a much higher rate than they lose energy due to internal damping. Therefore, by using resonance, the same amount of power can be transferred at greater distances, using the much weaker magnetic fields out in the peripheral regions ("tails") of the near fields. Resonant inductive coupling can achieve high efficiency at ranges of 4 to 10 times the coil diameter (Dant). This is called "mid-range" transfer, in contrast to the "short range" of nonresonant inductive transfer, which can achieve similar efficiencies only when the coils are adjacent. Another advantage is that resonant circuits interact with each other so much more strongly than they do with nonresonant objects that power losses due to absorption in stray nearby objects are negligible. A drawback of resonant coupling theory is that at close ranges when the two resonant circuits are tightly coupled, the resonant frequency of the system is no longer constant but "splits" into two resonant peaks, so the maximum power transfer no longer occurs at the original resonant frequency and the oscillator frequency must be tuned to the new resonance peak. Resonant technology is currently being widely incorporated in modern inductive wireless power systems. One of the possibilities envisioned for this technology is area wireless power coverage. A coil in the wall or ceiling of a room might be able to wirelessly power lights and mobile devices anywhere in the room, with reasonable efficiency. An environmental and economic benefit of wirelessly powering small devices such as clocks, radios, music players and remote controls is that it could drastically reduce the 6 billion batteries disposed of each year, a large source of toxic waste and groundwater contamination.

Capacitive coupling, also referred to as electric coupling, makes use of electric fields for the transmission of power between two electrodes (an anode and cathode) forming a capacitance for the transfer of power. In capacitive coupling (electrostatic induction), the conjugate of inductive coupling, energy is transmitted by electric field between electrodes such as metal plates. The transmitter and receiver electrodes form a capacitor, with the intervening space as the dielectric. An alternating voltage generated by the transmitter is applied to the transmitting plate, and the oscillating electric field induces an alternating potential on the receiver plate by electrostatic induction, which causes an alternating current to flow in the load circuit. The amount of power transferred increases with the frequency, the square of the voltage, and the capacitance between the plates, which is proportional to the area of the smaller plate and (for short distances) inversely proportional to the separation. Capacitive coupling has only been used practically in a few low power applications, because the very high voltages on the electrodes required to transmit significant power can be hazardous and can cause unpleasant side effects such as noxious ozone production. In addition, in contrast to magnetic fields, electric fields interact strongly with most materials, including the human body, due to dielectric polarization. Intervening materials between or near the electrodes can absorb the energy, in the case of humans possibly causing excessive electromagnetic field exposure. However capacitive coupling has a few advantages over inductive coupling. The field is largely confined between the capacitor plates, reducing interference, which in inductive coupling requires heavy ferrite "flux confinement" cores. Also, alignment requirements between the transmitter and receiver are less critical. Capacitive coupling has recently been applied to charging battery powered portable devices as well as charging or continuous wireless power transfer in biomedical implants, and is being considered as a means of transferring power between substrate layers in integrated circuits. Two types of circuit have been used: Transverse (bipolar) design: In this type of circuit, there are two transmitter plates and two receiver plates. Each transmitter plate is coupled to a receiver plate. The transmitter oscillator drives the transmitter plates in opposite phase (180° phase difference) by a high alternating voltage, and the load is connected between the two receiver plates. The alternating electric fields induce opposite phase alternating potentials in the receiver plates, and this "push-pull" action causes current to flow back and forth between the plates through the load. A disadvantage of this configuration for wireless charging is that the two plates in the receiving device must be aligned face to face with the charger plates for the device to work. Longitudinal (unipolar) design: In this type of circuit, the transmitter and receiver have only one active electrode, and either the ground or a large passive electrode serves as the return path for the current. The transmitter oscillator is connected between an active and a passive electrode. The load is also connected between an active and a passive electrode. The electric field produced by the transmitter induces alternating charge displacement in the load dipole through electrostatic induction.

Figure 11B:
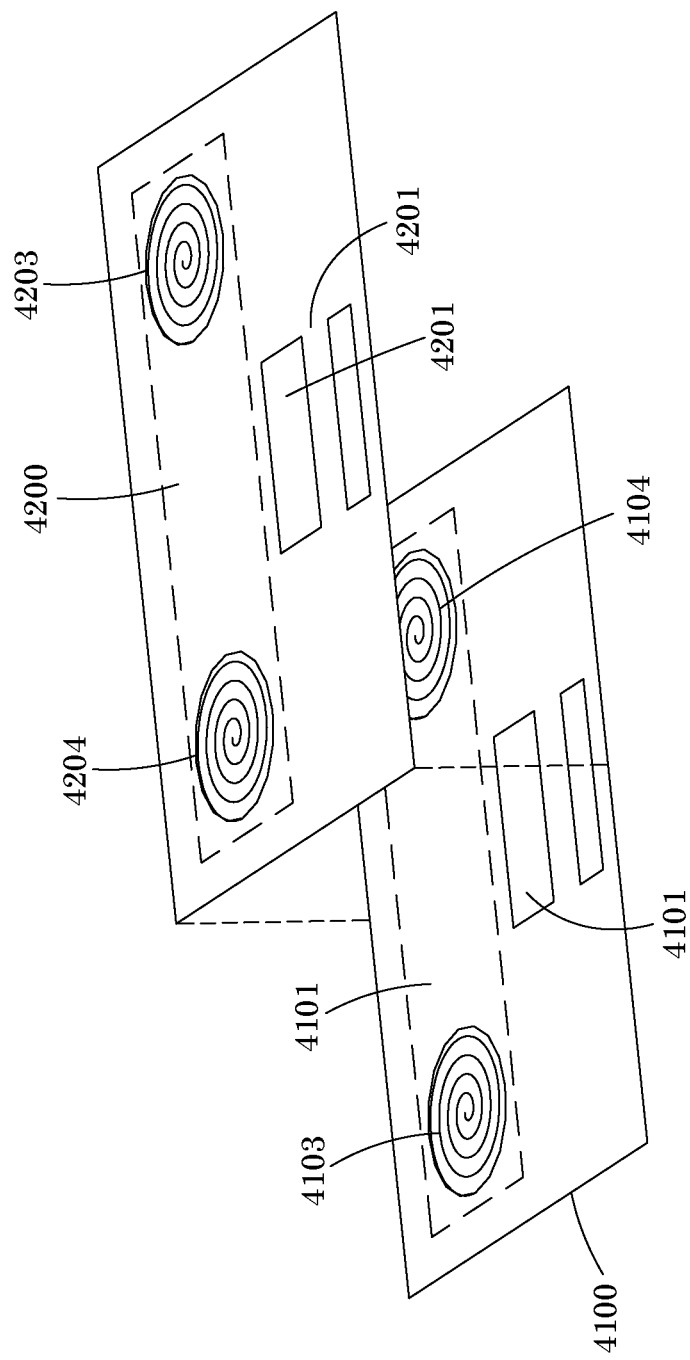
FIG. 11B shows the contactless photovoltaic tile and its components.

FIG. 11B shows a side perspective cross sectional view of the photovoltaic tile system showing a first contactless photovoltaic tile (4100) comprising a first inductive power unit (4101) comprising a first RX coil (4104), a first TX coil (4103), a first internal power storage unit (4101) and a first photovoltaic outer surface. The system also comprises a second contactless photovoltaic tile (4200) comprising a second inductive power unit (4201) comprising a second RX coil (4203), a second TX coil (4204), an internal power storage unit (4201) and a second photovoltaic outer surface. When the first photovoltaic tile (4100) is positioned on top of the second photovoltaic tile (4200), the TX coil (4104) from the first photovoltaic tile (4100) aligns with the second RX coil (4203), thus transmitting the electricity from one photovoltaic tile (4100) to the other photovoltaic tile (4200) as explained in FIG. 12.

In a different embodiment of the technology the correct positioning of the devices is assisted by magnets located in the surrounding of both the TX coil of the first contactless photovoltaic tile and the RX coil of the second contactless photovoltaic tile.

Figure 11C:
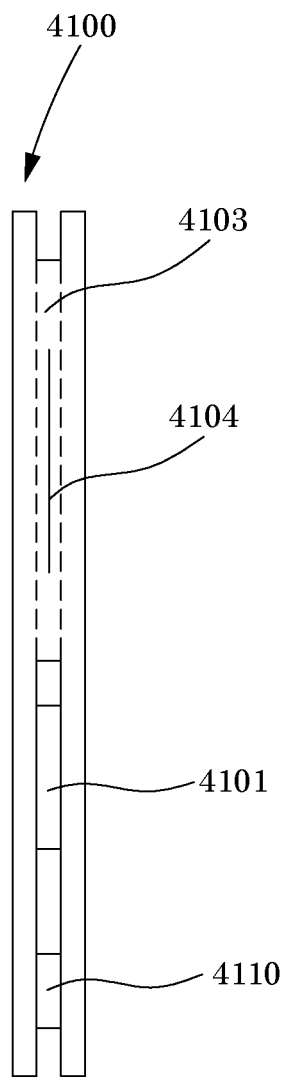
FIG. 11C shows a side cross sectional view of the contactless photovoltaic tile.

FIG. 11C shows a side cross sectional view of the contactless photovoltaic tile (4100) showing the photovoltaic outer surface (4110), the middle layer with the RX coil (4103), the TX coil (4104), internal power storage unit (4101) and the opposite outside layer with a surface that can be adhered to a surface such as a roof shingle or a building facade to name a few.

In a different embodiment of the technology, the opposite outside layer has adhesives on it.

Figure 12A:
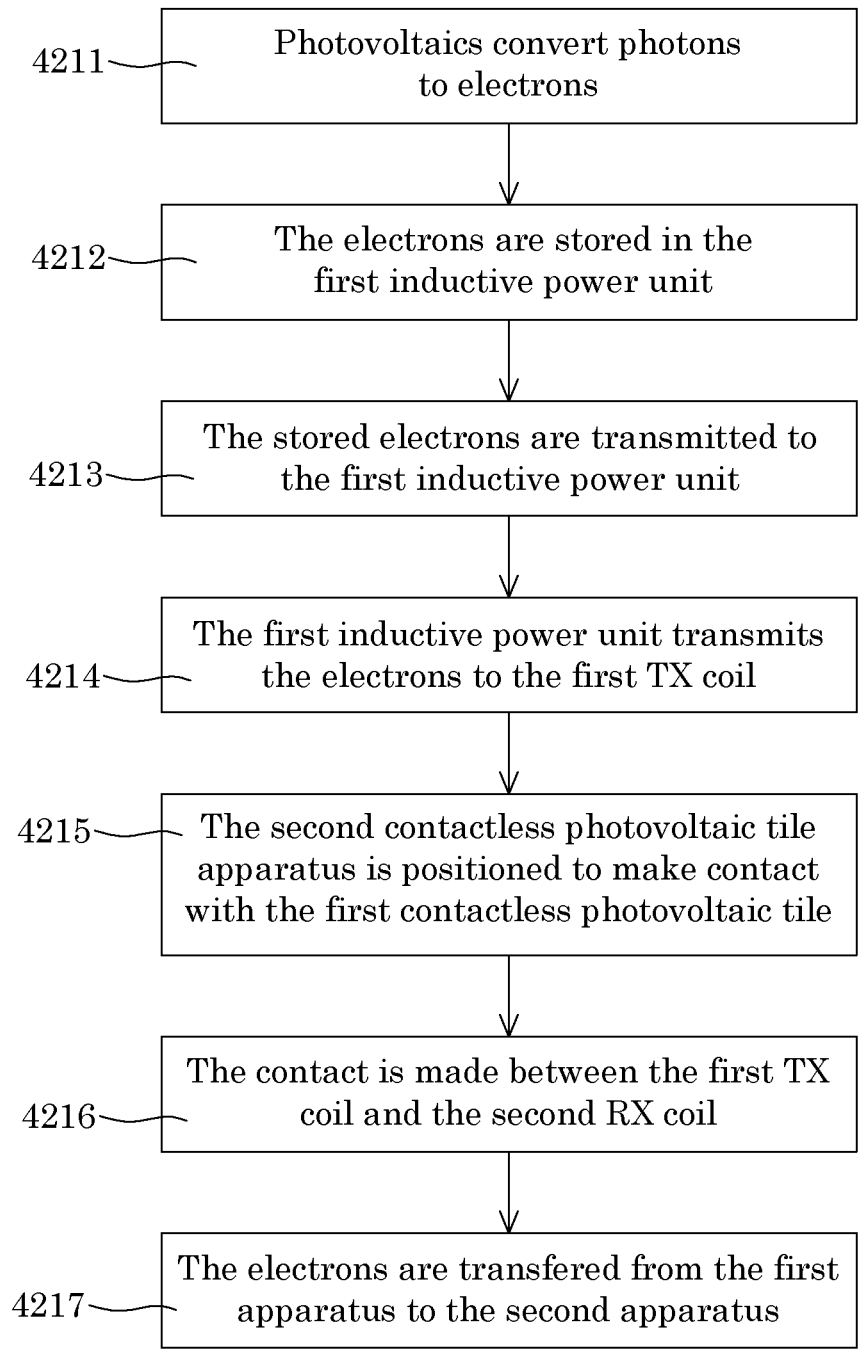
FIG. 12A shows a flow chart describing the operation of the photovoltaic.

FIG. 12A shows a flow chart describing the operation of the system:

Step 4211 the first photovoltaic outer surface converts photons to electrons.

Step 4212 the electrons are stored in the first internal power storage unit.

Step 4213 the stored electrons are transmitted to the first inductive power unit.

Step 4214 the first inductive power unit transmits the electrons to the first TX coil.

Step 4215 the second contactless photovoltaic tile is positioned to make contact with the first contactless photovoltaic tile.

Step 4216 the contact is made between the first TX coil and the second RX coil;

Step 4217 wherein electrons are inductively transferred between the first contactless photovoltaic tile to the second contactless photovoltaic tile.

Figure 12B:
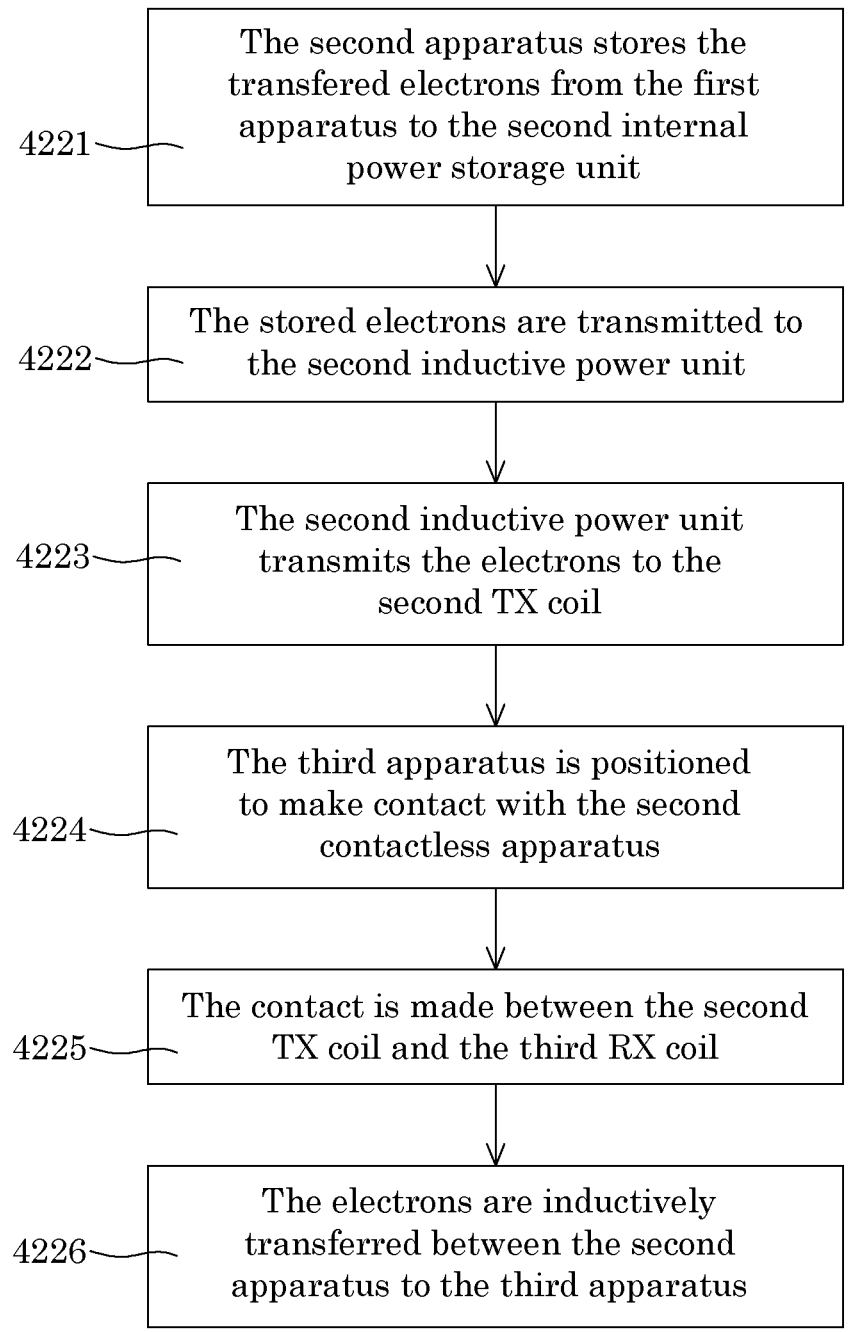
FIG. 12B shows a flow chart describing the operation of the system when a third photovoltaic tile apparatus is introduced.

FIG. 12B shows a flow chart describing the operation of the system when a third photovoltaic tile is introduced.

In a different embodiment of the present technology, a third contactless photovoltaic tile comprising a third inductive power unit comprising a third RX coil, a third TX coil, a third internal power storage unit and a third photovoltaic outer surface is added to the system, thus performing the steps as described in the flowchart below.

Step 4221 The second contactless tile stores the transferred electrons from the first contactless tile in the second internal power storage unit.

Step 4222 the stored electrons are transmitted to the second inductive power unit.

Step 4223 the second inductive power unit transmits the electrons to the second TX coil.

Step 4224 The third contactless photovoltaic tile is positioned to make contact with the second contactless photovoltaic tile;

Step 4225 the contact is made between the second TX coil and the third RX coil.

Step 4226 the electrons are inductively transferred between the second contactless photovoltaic tile to the third contactless photovoltaic tile.

One familiar with the art will appreciate that the energy transferred from tile to tile eventually will get to a power distribution unit or energy inverter and then the energy is used to power electric devices, store or feed back to the grid.

Figure 13:
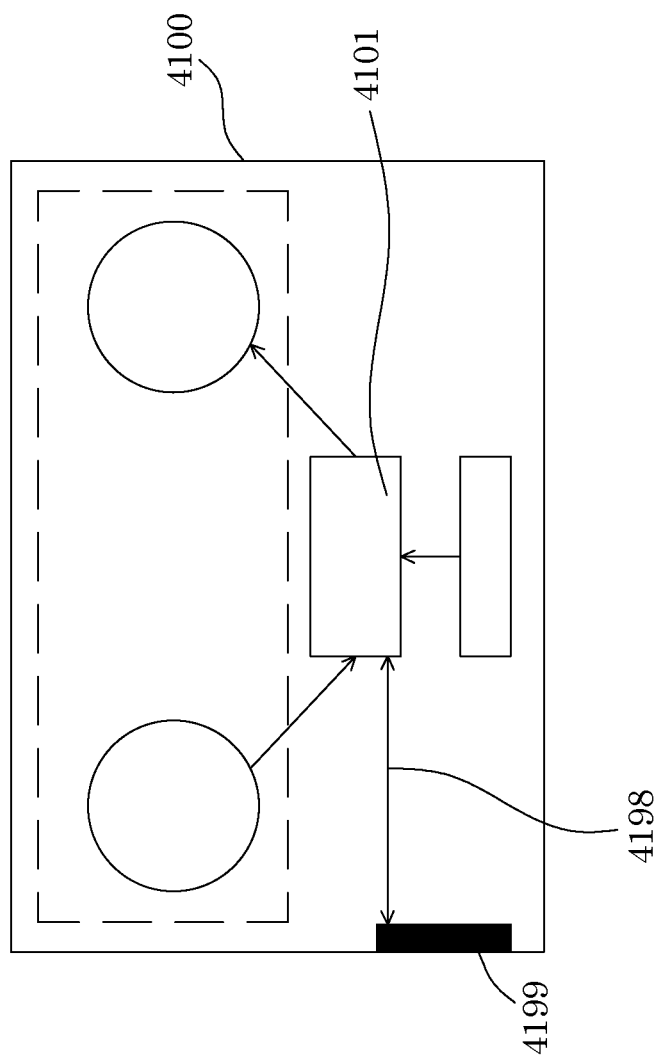
FIG. 13 shows a front cross-sectional view of a different embodiment of the technology.

FIG. 13 shows a front cross-sectional view of a different embodiment of the technology where the contactless photovoltaic tiles (4100) have a connector (4199) to input or withdraw (4198) the energy stored in the internal energy storage unit (4101).

Façade Installation:

Real estate is scarce. Solar panels are traditionally installed in the roof of buildings, in the ground or at solar farms. There is described a photovoltaic tile that can be installed vertically in building facades wherein the photovoltaic tiles connect between each other in series transporting the energy collected from each photovoltaic tile to another to an inverter at the bottom or edge of the wall or building facade.

Figure 14:
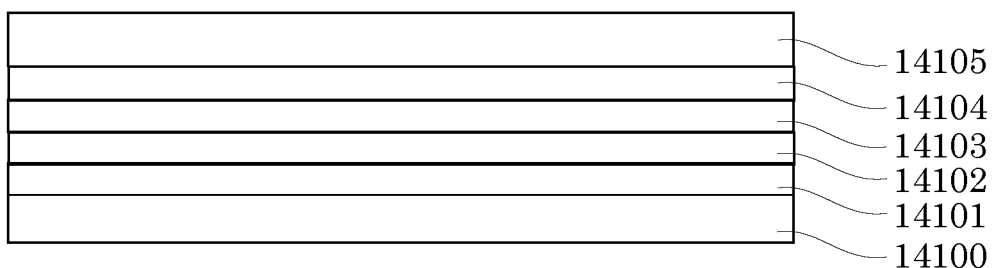
FIG. 14 shows a side view of a multilayered photovoltaic tile.

FIG. 14 shows a side view of a multilayered photovoltaic tile that is rigid or flexible comprising of a frontal side with photovoltaic cells made of perovskite crystals or silicon comprising a stack of a first layer (14100) comprising an outside layer encapsulation, wherein the encapsulation comprises one or more from the group of polymers, glass; a second layer (14101) optically connected to the first layer (14100) comprising transparent electrodes that act as electron transport. One familiar with the art will appreciate that transparent electrodes can be made of different materials including ITO Indium Tin Oxide, metal mesh or wire mesh, nanowires such as silver nanowires and other similar technologies that allow less resistance and high optical transmission. A third layer (14102) optically connected to the second layer (14101) comprising semiconducting material. A fourth layer (14103) optically connected to the third layer (14102) comprising transparent electrodes that act as hole transport. One familiar with the art will appreciate that an electron transport layer and a hole transport layer are needed to create a circuit to collect and convert solar energy to electrical energy. A fifth layer (14104) mechanically connected to the fourth layer (14103), comprising horizontal track wires that transport energy from one side of the multilayered photovoltaic tile to another side; wherein the track wires start and end in a connector; wherein the connectors face to the outside of the frontal side of the multilayered photovoltaic tile.

In a different embodiment of the present technology, a sixth layer (14105) mechanically connects to the fifth layer (14106). This sixth layer comprises vertical track wires that transports energy from one side of the multilayered photovoltaic tile to another side; wherein the vertical track wires start and end in a connector; wherein the connector faces to the outside of the frontal side of the multilayered photovoltaic tile.

Continuing with the description of FIG. 14, it also comprises a backside with a first and second face made of a material form the group of ceramic, polymer, metal, wood; wherein the first face of the backside is mechanically connected to the last layer of the multilayer photovoltaic tile; wherein the second face of the backside comprises a texture to facilitate the installation of the photovoltaic tile to a material surface from the group of as cement, wood, ceramic tile, polymers, paper substrates.

Figure 15:
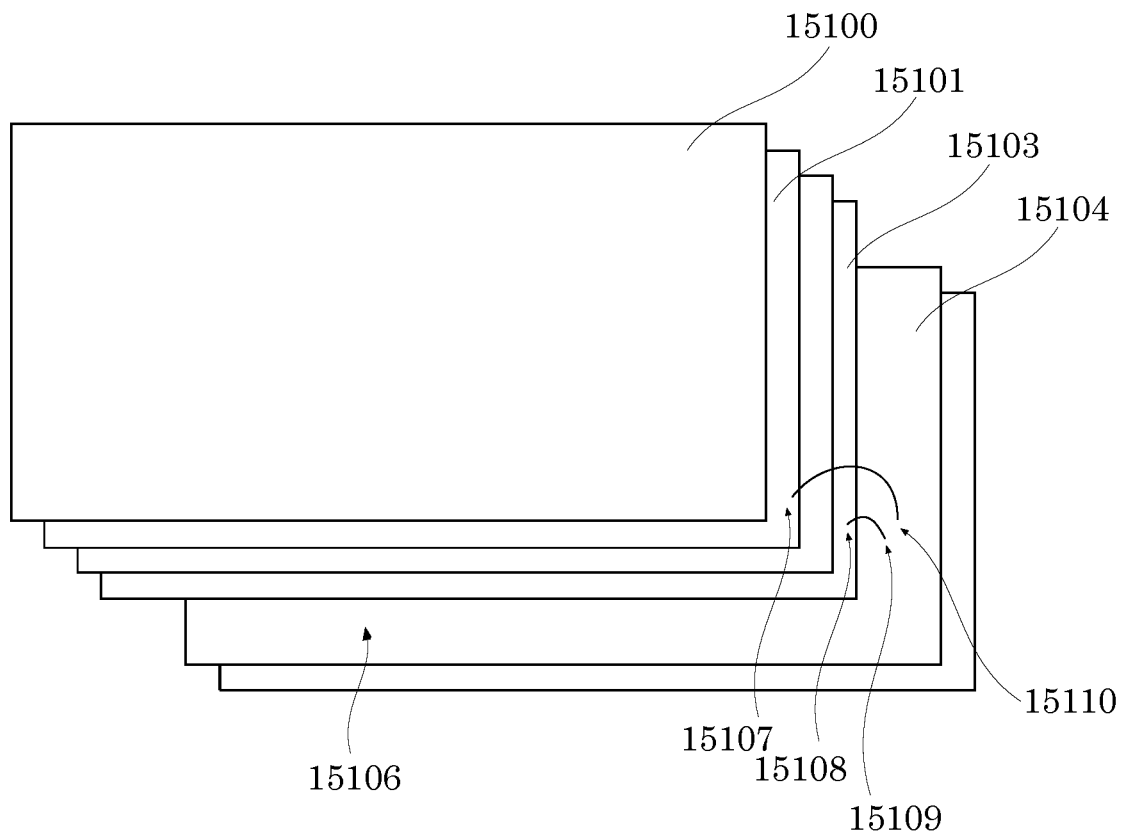
FIG. 15 shows a front perspective view of the multilayered photovoltaic tile.

FIG. 15 shows a front perspective view of the multilayered photovoltaic tile that has a first identificator (15100) which are fixed or selectable. A fixed switch is one that is factory produced that way and cannot be changed by the user. Wherein the selectable option is for example one with DIP switches or operated by jumpers where a user selects which wire tracks are to be used for the transportation of the energy collected by that specific photovoltaic tile to another or to an inverter. One familiar with the art will appreciate that a series of photovoltaic tiles can be installed in a building facade without the need for individual wires to run between the photovoltaic tiles as the photovoltaic tiles of the technology have a dedicated layer to transport the energy collected by many photovoltaic tiles connected in parallel or in series.

Continuing with the description from FIG. 15, the first identificator (15100) corresponds to a set of horizontal track wires from the fifth layer (15106); wherein the transparent electrodes from the second (15101) and fourth layer (15103) are mechanically connected to their corresponding horizontal track wires, via connecting wires (15107, 15108, 15109, 15110) located in the fifth layer (15104); wherein the corresponding horizontal track wires are defined by the first identificator.

Figure 16A:
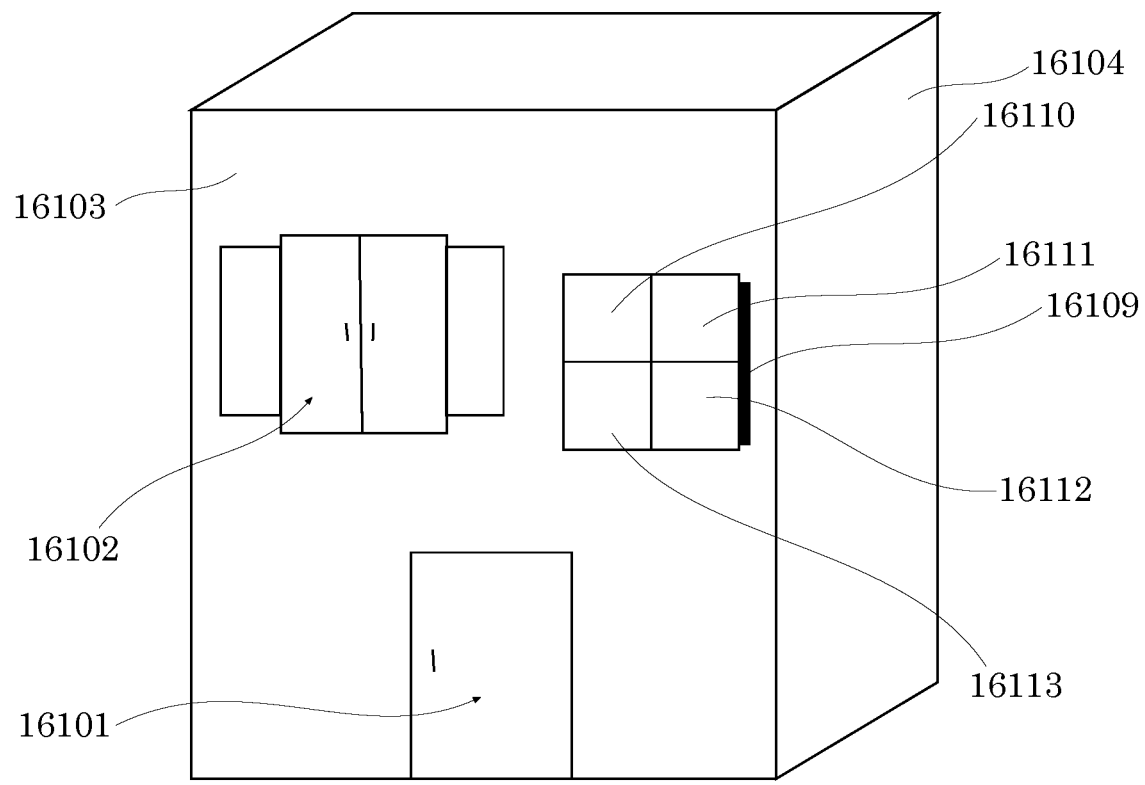
FIG. 16A shows a front perspective view of a house with its respective parts, including photovoltaic tiles.

FIG. 16A shows a front perspective view of a house with a door (16101), a window (16102), the front (16103) and side (16104) of a building facade, and a set of 4 photovoltaic tiles (16109) that consist of 4 individual photovoltaic tiles (16110, 16111, 16112, 16113) part of this technology.

Figure 16B:
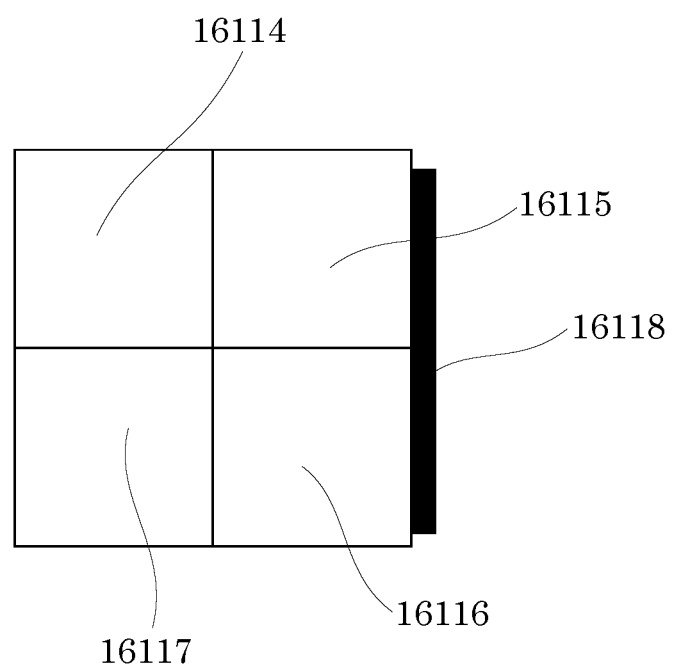
FIG. 16B shows a front view of a cluster of photovoltaic tiles, showing how the connector from the horizontal track wires can be bridged to the vertical track wires connector.

FIG. 16B shows a front view of a set of 4 photovoltaic tiles (16114, 16115, 16116, 16117), showing how the connector from the horizontal track wires can be bridged to the vertical track wires connector (16118). This allows for transportation of electricity when an obstacle is encountered when installing the photovoltaic tiles, wherein the first indicator is selectable.

In a different embodiment of the present technology a set of horizontal track wires is not connected to any transparent electrodes and can be used for transport of electricity created by other photovoltaic tiles.

In a different embodiment of the technology the transparent electrodes from the fourth and sixth layers connect to a first horizontal track wire set.

Figure 17:
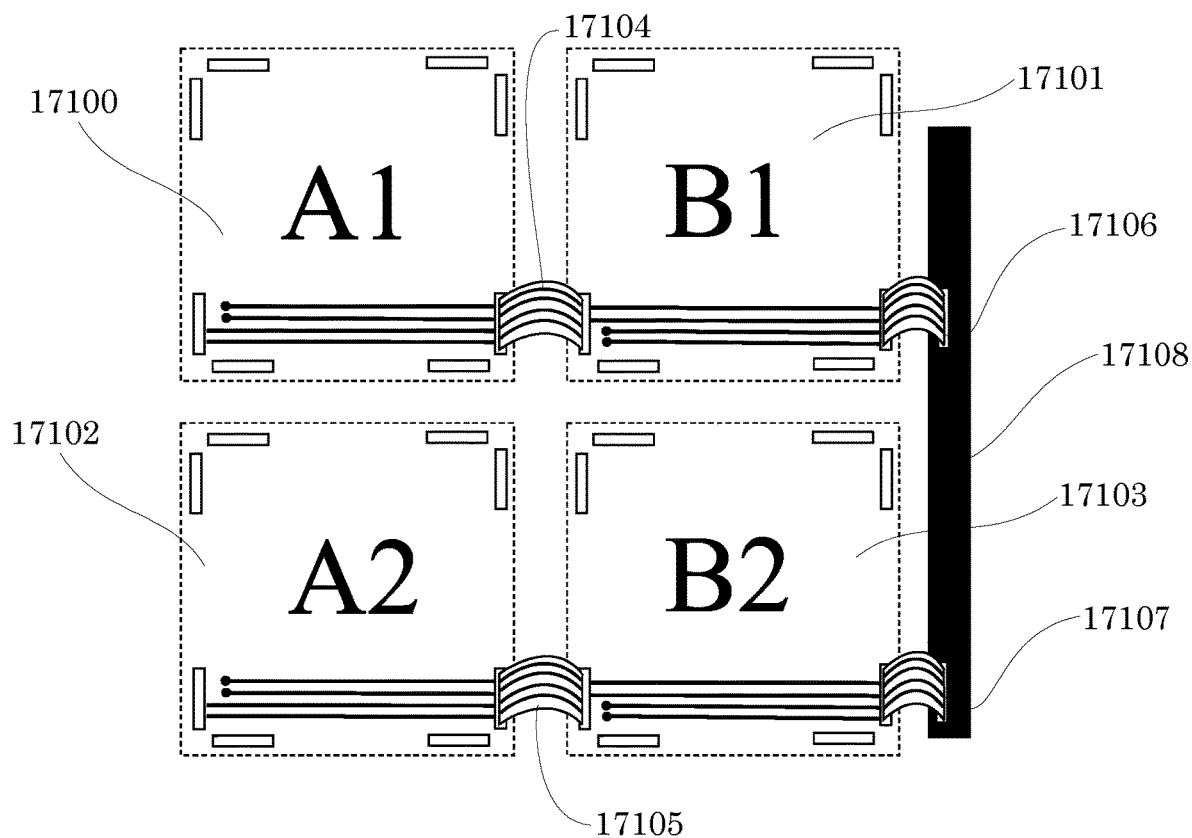
FIG. 17 shows a system consisting of four photovoltaic tiles mechanically connected to one another.

FIG. 17 shows a system comprising of: a first photovoltaic tile 17100), mechanically connected to a second photovoltaic tile (17101), via a harness (17104); wherein the harness comprises a multi connector that transports the energy from the first photovoltaic tile to the second photovoltaic tile; a third photovoltaic tile (17102), mechanically connected to the fourth photovoltaic tile (17103), via a harness that transports the energy from the third photovoltaic tile to the fourth photovoltaic tile (17105); one or more inverters from the group of microinverter, string inverter, power optimizer, smart module; wherein the second (17101) and fourth (17103) photovoltaic tile connects to the inverter (17108) via two harnesses (17106, 17107).

There are several types of inverter technologies that Canadian installers will use with your solar system. The most efficient ones are microinverters that are common for roof-mounted systems. String inverters are less efficient but are common for ground-mounted systems and are commonly used with add-on technologies such as power optimizers and smart modules. Smart modules can also be used with microinverters.

Microinverters work by converting electricity from DC to AC at each individual panel—this makes microinverters more efficient than string inverters if you expect shading on your system or if your system faces more than one direction.

Converting power at the panel level also allows you to monitor individual panel performance—an important consideration if you want to be able to quickly identify reversible shading (leaves, bird droppings, etc.). Most microinverters will also allow you to track performance in real time using a mobile or desktop app and send you email alerts if power output drops below the expected range for an extended period of time.

Individual panel tracking is also great for taking full advantage of your 25-year power output guarantee. Not only will you be able to easily identify which panels are performing sub-optimally, but so will your installers. This makes changing a problematic panel a quick and easy process.

The downside of microinverters is their relative price and long-term reliability. Because so many individual units are needed (one per panel or one per every two panels), their total cost tends to be more expensive and the chances of one failing over the lifetime of your system is also increased.

String inverters work similar to how they sound: a series of panels are tied together in a 'string', and then the combined power from the panels is converted from DC to AC together. String inverters are best suited for panels that are all facing the same direction AND if no shading is expected—this is most often the case for ground-mounted systems. The main benefit of using string inverters is that they are cheap, mostly because less equipment is needed. However, you lose the ability to track the performance of individual panels (like you can with microinverters), making it difficult to isolate a problematic panel should performance decline unexpectedly.

Since the power from all panels is combined before it's converted from DC to AC, the power lines have a very high voltage which may make them unsafe for certain on-roof applications. Ground mounted systems, again, are the most suitable application because power lines are typically buried and high voltage is not an issue.

Power optimizers work by 'conditioning' the electricity of each individual panel (matching the output voltage of the panel with the voltage of the entire string) before power is converted from DC to AC at the string inverter. They are often used with string inverters to 'regain' several important benefits that are common with microinverters. Power optimizers are used on every panel, so you can track individual panel power output. They are also suitable for use when panels are facing in more than one direction or if shading is expected. Power optimizers may also provide some additional efficiency benefits (depending on the system) that microinverters cannot due to the conditioned electricity and the possibility of the accompanying string inverter being installed in a cooler location than the roof. See the inverter efficiency section for more details on inverter efficiency (this page). Power optimizers also tend to make the system safer than just using string inverters alone because they can shut down individual panels in case of overheating or voltage spikes. However, power lines still remain at relatively high voltage which may make them unsuitable for some on-roof applications.

The final term that you might hear is 'smart module'-smart modules are solar panels with power optimizers built into them. These power optimizers can be used with both string and micro inverters. If you use smart modules with a string inverter then you will 'regain' all of the benefits discussed in the previous section. If you use smart modules with microinverters then you will gain safety benefits discussed in the previous section. Smart modules are still a new and relatively rare technology.

Solar Panel Color Tiles

Buildings, houses and walls are painted in different colors. Solar panels are made of silicon which is dark grey or dark blue. There is described a solar panel tile made of opaque or translucent perovskite crystal, whereby the crystal by itself or in combination with the background gives the solar panel tile a perceived color. In a different embodiment of the technology, the crystals change color on command when an electric field is applied. One familiar with the art will appreciate that the photovoltaic tile can change colour when a stimulus is received, such stimuli comprises one or more from the group of electric, electro-chromatic, thermochromic, photochromic.

FIG. 18A shows a diagram of a solar panel tile (12100) made of solar cells (12102) of the technology, comprising: a color case (12103), a series of perovskite crystals (12110) that acts as solar energy absorbers, a translucent frontal conductive film (12111) tinted in a shade of color, where the shade of color can be customized at fabrication within a range of available colors; an opaque color background (12112) made of a conductive material, at least one first connector (12113) that connects the solar panel tile (12100) to one or more from the group of a second solar panel tile, a cable, a controller, wherein the connector mechanically connects a first and a second solar panel tiles. In a different embodiment of the technology, the connector electronically connects a first to a second solar panel tile, or to a controller or hub.

In a different embodiment of the technology there is a second connector, wherein the second connector acts as an input and the first connector acts as an output.

Figure 18B:
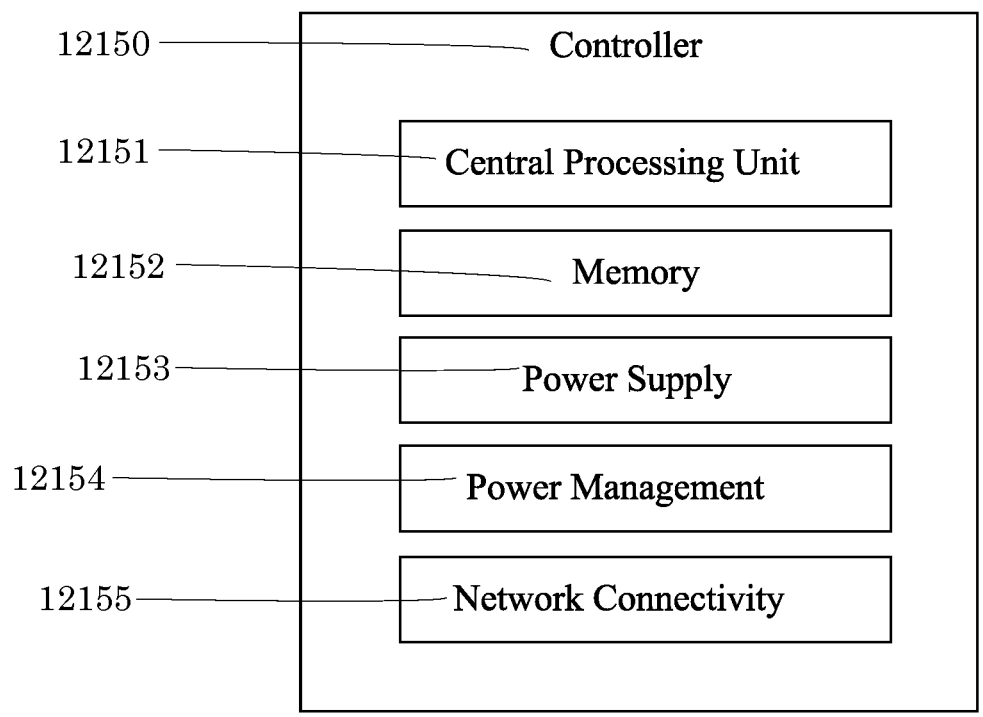
FIG. 18B shows a diagram of a different embodiment of the technology, including a translucent frontal conductive film.

FIG. 18B shows a diagram of a different embodiment of the technology further comprising a controller (12150) comprising a CPU (12151), memory (12152), power supply (12153), power management (12154), network connectivity (12155), wherein the controller (12150) connects to one or more from the group of solar panel tiles, remote server, smart gadget, energy management hub. Wherein the controller (12150) controls the energy field applied to the crystals to regulate the color the crystal adopts.

Figure 19:
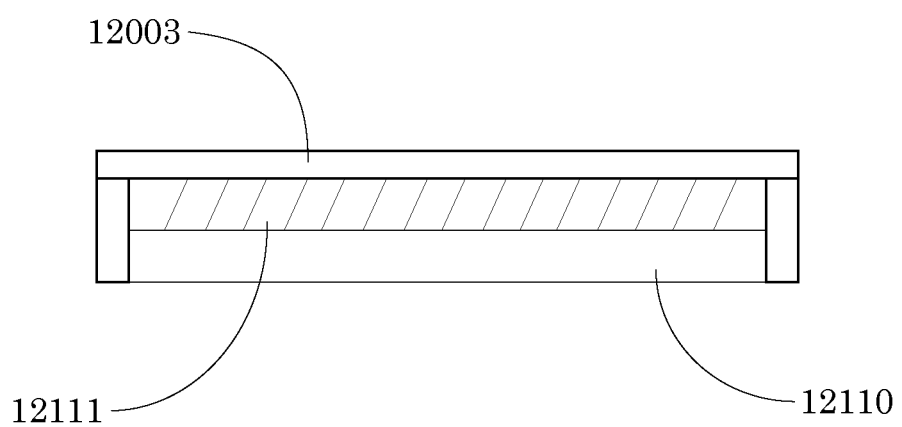
FIG. 19 shows a side view of a different embodiment of the technology, in which the perovskite crystals are translucent.

FIG. 19 shows a side view of a different embodiment of the technology. The perovskite crystals (12110) are translucent, and work with the frontal conductive film (12111) to produce a specific color. In a different embodiment of the technology, the perovskite crystals (12110), in combination with the frontal conductive film (12111) produce a color that resembles the color of the case (12003).

Figure 20:
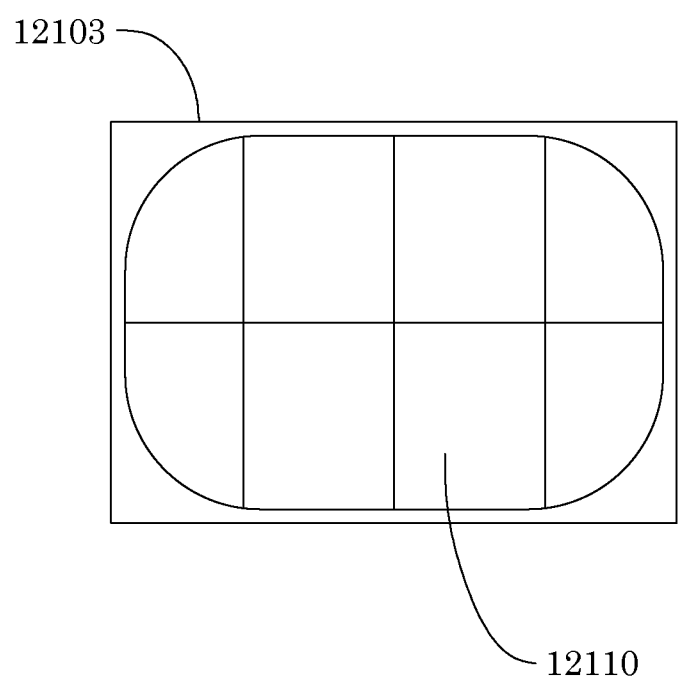
FIG. 20 shows a frontal view of a different embodiment of the technology in which the perovskite crystals are opaque.

FIG. 20 shows a frontal view of a different embodiment of the technology where the perovskite crystals (12110) are opaque and their color matches the color of the case (12103).

Figure 21:
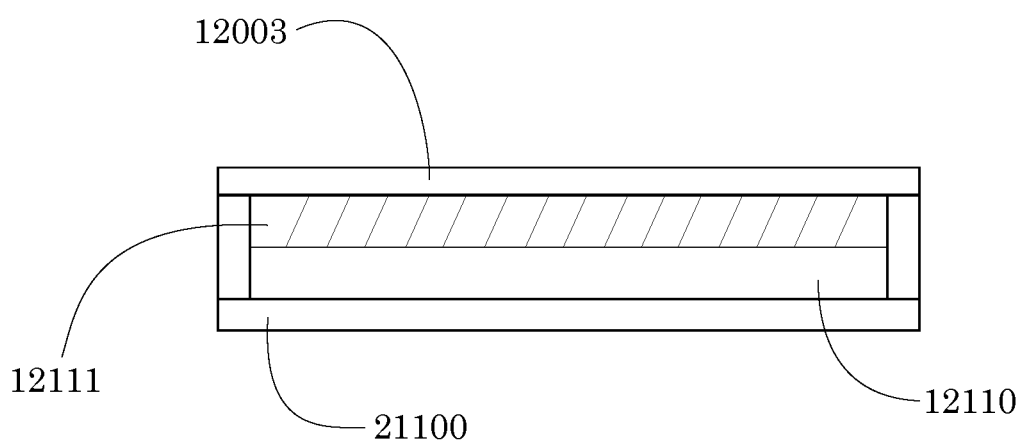
FIG. 21 shows a side view of a different embodiment of the technology.

FIG. 21 shows a side view of a different embodiment of the technology further comprising one or more from the group of a filter, polarizer, color film; placed inside or outside the translucent frontal conductive film (21100).

Figure 22:
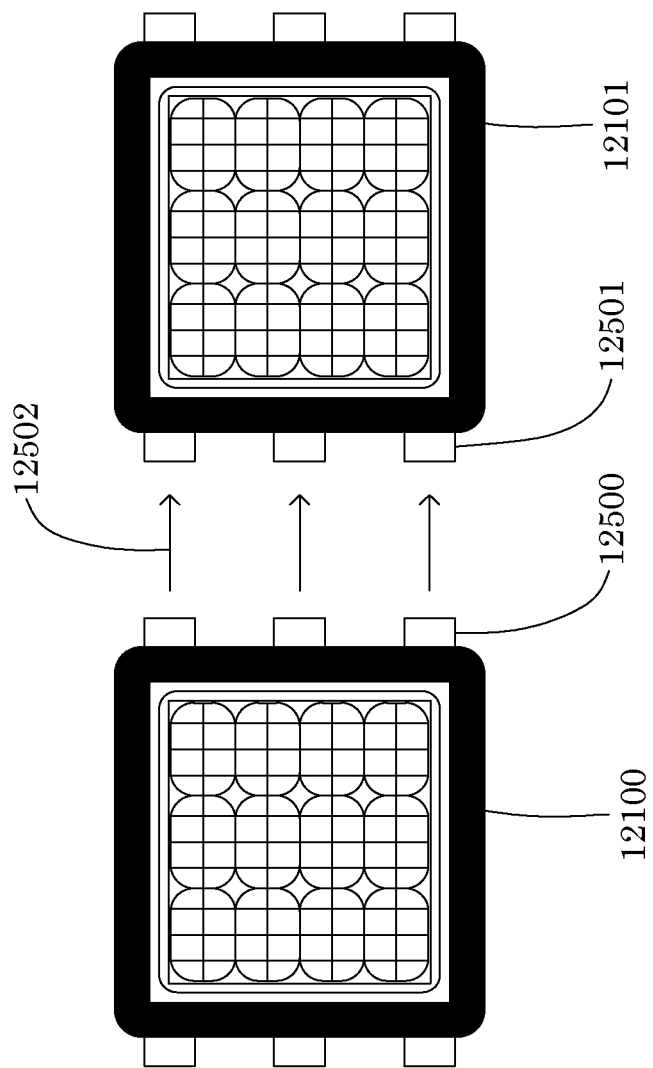
FIG. 22 shows a top view of the solar panel tile wherein the connector mechanically connects them side by side.

FIG. 22 shows a top view of two side by side solar panel tiles (12100, 12101). The first solar panel tile (12100) comprises multiple connectors, wherein one of the connectors (12500) mechanically connects to the second solar panel connector (12501) when they are installed side by side (12502).

Figure 23:
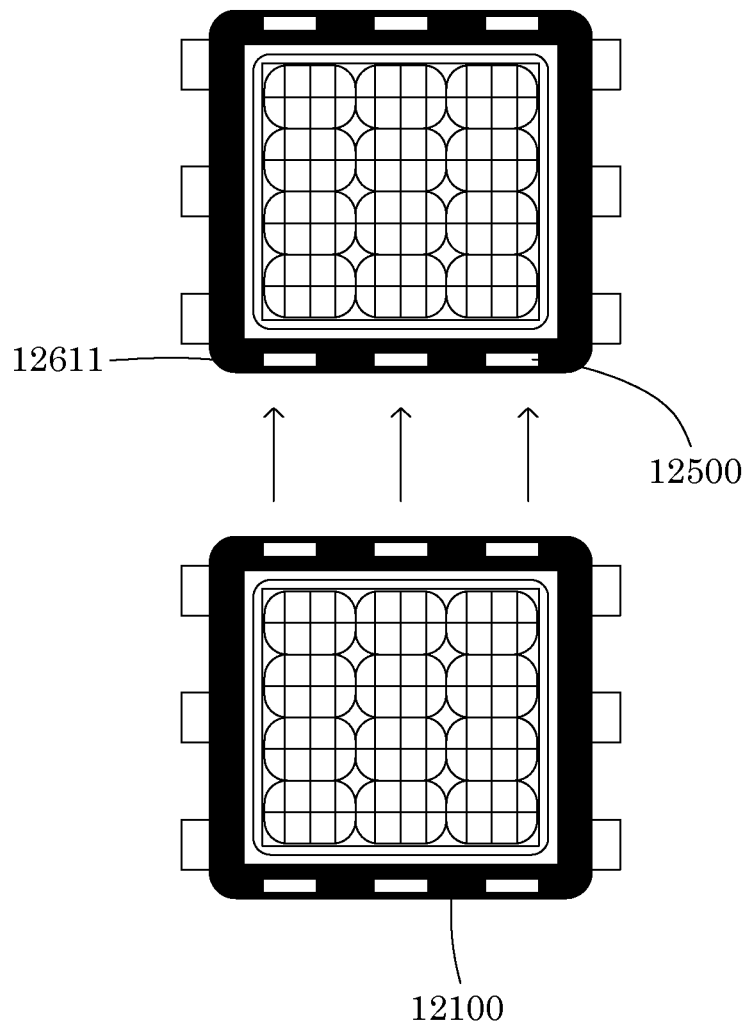
FIG. 23 shows a top view of the solar panel tile where the connector is able to connect to the first tile.

FIG. 23 shows a top view of the solar panel tile (12100) where the connector (12500) mechanically connects at least a portion of a first tile (12100), on top of at least a portion of a second tile (12611).

Figure 24:
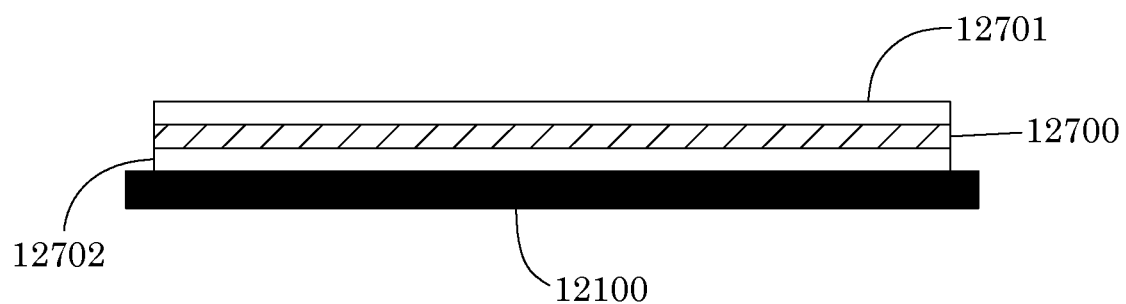
FIG. 24 shows a side view of a different embodiment of the technology comprising a second translucent thin film layer.

FIG. 24 shows a side view of a different embodiment of the technology comprising a second translucent thin film layer (12700) in between a translucent frontal conductive film (12701) tinted in a shade of color and the perovskite crystal (12702), wherein the perovskite crystal changes of color when an energy field is applied.

Compositions Color FAPbBr3 Orange FAPb(I0.2IBr0.8)3 Light Red FAPb(I0.3Br0.7)3 Light Red FAPb(I0.4Br0.6)3

Dark Red FAPb(I0.6Br0.4)3 Dark Red FAPb(I0.7Br0.3)3 Orange/Red FAPb(I0.8Br0.2)3 Black FAPb(I0.9Br0.1)3 Black FAPbI3 Black 28

In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

While example embodiments have been described in connection with what is presently considered to be an example of a possible most practical and/or suitable embodiment, it is to be understood that the descriptions are not to be limited to the disclosed embodiments, but on the contrary, is intended to cover various modifications and equivalent arrangements included within the spirit and scope of the example embodiment. Those skilled in the art will recognize or be able to ascertain using no more than routine experimentation, many equivalents to the specific example embodiments specifically described herein. Such equivalents are intended to be encompassed in the scope of the claims, if appended hereto or subsequently filed.

The invention claimed is:

1. A solar energy harvesting system, the solar energy harvesting system comprising:
   a multiplicity of flexible tiles, each flexible tile including a flexible pad which includes an upper surface and a lower surface, an adhesive layer on the lower surface, at least one perovskite solar cell on the upper surface, the perovskite solar cell including a perovskite layer, at least one junction box, and a wireless radio which is in electronic communication with the junction box;
   a smart device which is in wireless communication with the wireless radio; and
   a flexible conduit harness that is a conductive tape, which includes a flexible casing which includes an outer layer and a back layer, a wire embedded in the flexible casing between the outer layer and the back layer, the wire in electrical communication with each junction box, and an adherent on the back layer, wherein the multiplicity of flexible tiles define a space between adjacent tiles and the flexible conduit harness seals the space between adjacent flexible tiles.

2. The solar energy harvesting system of claim 1, further comprising a battery in electrical communication with the power distribution system.

3. The solar energy harvesting system of claim 2, further comprising an electrically conductive bolt, pin or screw mechanically attaching the flexible conduit harness to the flexible tile and for electrical communication between the flexible conduit harness and the flexible tile.

4. The solar energy harvesting system of claim 1, further comprising a controller which includes a power supply, the controller in electrical communication with the perovskite layer.

5. A method of customizing the colour of a solar energy harvesting system, the method comprising: a user selecting the solar energy harvesting system of claim 1; the user connecting the controller to a power supply; and the user adjusting the power sent to the perovskite layer with the controller, thereby customizing the colour of the solar energy harvesting system.

6. A method of customizing the colour of a solar energy harvesting system, the method comprising: a user selecting a solar energy harvesting system which includes:
   a multiplicity of flexible tiles, each flexible tile including a flexible pad which includes an upper surface and a lower surface, an adhesive layer on the lower surface, at least one perovskite solar cell on the upper surface, the perovskite solar cell including a perovskite layer, at least one junction box, and a wireless radio which is in electronic communication with the junction box;
   a controller, the controller in electrical communication with the perovskite layer;
   a smart device which is in wireless communication with the wireless radio; and
   a flexible conduit harness which includes a flexible casing which includes an outer layer and a back layer, a wire embedded in the flexible casing between the outer layer and the back layer, the wire in electrical communication with each junction box, and an adherent on the back layer, wherein the multiplicity of flexible tiles define a space between adjacent tiles and the flexible conduit harness seals the space between adjacent flexible tiles, and
and the user adjusting the power sent to the perovskite layer with the controller, thereby customizing the colour of the solar energy harvesting system.

* * * * *